United States Patent
Hsu et al.

(10) Patent No.: US 8,619,391 B2
(45) Date of Patent: Dec. 31, 2013

(54) MAGNETIC WRITE HEADS WITH BI-LAYER WRAP AROUND SHIELDS HAVING DISSIMILAR SHIELD LAYER WIDTHS

(75) Inventors: Yimin Hsu, Sunnyvale, CA (US); Aron Pentek, San Jose, CA (US); Thomas Roucoux, San Jose, CA (US); Jing Zhang, Los Altos, CA (US); Honglin Zhu, Fremont, CA (US)

(73) Assignee: HGST Netherlands, B.V., Amsterdam (NL)

( * ) Notice: Subject to any disclaimer, the term of this patent is extended or adjusted under 35 U.S.C. 154(b) by 234 days.

(21) Appl. No.: 12/914,543

(22) Filed: Oct. 28, 2010

(65) Prior Publication Data

US 2012/0106002 A1    May 3, 2012

(51) Int. Cl.
  *G11B 5/31*  (2006.01)
(52) U.S. Cl.
  USPC .................................................. 360/125.3
(58) Field of Classification Search
  USPC ..................................................... 360/125.3
  See application file for complete search history.

(56) References Cited

U.S. PATENT DOCUMENTS

| 7,009,812 | B2 | 3/2006 | Hsu et al. | |
|---|---|---|---|---|
| 7,239,478 | B1 * | 7/2007 | Sin et al. | 360/125.3 |
| 7,379,276 | B2 | 5/2008 | Im et al. | |
| 7,392,577 | B2 | 7/2008 | Yazawa et al. | |
| 7,394,620 | B2 | 7/2008 | Taguchi | |
| 7,633,714 | B2 | 12/2009 | Sasaki et al. | |
| 8,000,059 | B2 * | 8/2011 | Jiang et al. | 360/125.3 |
| 8,120,874 | B2 * | 2/2012 | Hsiao et al. | 360/119.04 |
| 2005/0141137 | A1 | 6/2005 | Okada et al. | |
| 2007/0146929 | A1 | 6/2007 | Maruyama et al. | |
| 2009/0002895 | A1 | 1/2009 | Pust et al. | |
| 2009/0154026 | A1 * | 6/2009 | Jiang et al. | 360/319 |
| 2009/0168240 | A1 * | 7/2009 | Hsiao et al. | 360/125.02 |
| 2010/0302688 | A1 * | 12/2010 | Shiimoto et al. | 360/319 |
| 2010/0328816 | A1 * | 12/2010 | Guan et al. | 360/123.12 |
| 2011/0222188 | A1 * | 9/2011 | Etoh et al. | 360/123.12 |
| 2011/0261485 | A1 * | 10/2011 | Pentek et al. | 360/122 |

FOREIGN PATENT DOCUMENTS

| JP | 2009259365 A | 11/2009 |
|---|---|---|
| JP | 20100044818 A | 2/2010 |

* cited by examiner

*Primary Examiner* — Mark Blouin
(74) *Attorney, Agent, or Firm* — Duft Bornsen & Fettig, LLP

(57) ABSTRACT

Magnetic write heads and corresponding fabrication methods for bi-layer wrap around shields resulting in dissimilar shield layer widths are disclosed. A gap structure is formed around a main write pole for a magnetic write head. A wrap around shield for the main write pole is fabricated to include a first magnetic layer proximate to the main write pole and a second magnetic layer on the first magnetic layer. A width of the first magnetic layer is less than the width of the second magnetic layer, and back edges of the first and second magnetic layers are coplanar. Further, a throat height of the wrap around shield is maintained between the first and the second magnetic layers because their back edges are coplanar.

8 Claims, 27 Drawing Sheets

ABS

ABS (PLANE A)

BACK EDGE FOR A WRAP AROUND SHIELD

ABS (PLANE A)

BACK EDGE FOR A WRAP AROUND SHIELD

ABS (PLANE A)

BACK EDGE FOR A WRAP AROUND SHIELD

MAGNETIC WRITE HEADS WITH BI-LAYER WRAP AROUND SHIELDS HAVING DISSIMILAR SHIELD LAYER WIDTHS

FIELD OF THE INVENTION

The invention is related to the field of magnetic disk drive systems, and in particular, to magnetic write heads including bi-layer wrap around shields.

BACKGROUND

Many computer systems use magnetic disk drives for mass storage of information. Magnetic disk drives typically include one or more sliders having a read head and a write head. An actuator/suspension arm holds the slider above the surface of a magnetic disk. When the disk rotates, an air flow generated by the rotation of the disk causes an air bearing surface (ABS) side of the slider to fly at a particular height above the disk. As the slider flies on the air bearing, a voice coil motor (VCM) moves the actuator/suspension arm to position the read/write head over selected tracks of the disk. The read/write head may then read data from or write data to the tracks of the disk.

A typical write head includes a main write pole and a return pole. The main write pole has a yoke portion and a pole tip portion. The pole tip extends from the ABS of the write head to the yoke of the write pole. The point where the pole tip meets the yoke is referred to as the flare point. The point where the yoke begins has a trapezoidal shape that flares outwardly from the pole tip. The yoke of the main write pole then connects to the return pole through a back gap. A coil wraps around the yoke or the back gap to provide the magnetic flux used for the write operation. The width of the pole tip controls the track width that is written by the recording head, so the width of the pole tip is preferably small (i.e., less than 100 nanometers).

Write heads and other components of the slider are typically produced using thin-film deposition and patterning techniques. Material layers which make up a write head for a slider are typically formed by depositing full film materials of the main write pole layers on a non-magnetic layer (e.g., alumina), depositing and patterning a masking layer over the main write pole layers to form a mask structure, etching the exposed portion of the main write pole layers around the mask structure to define a pole tip and a flare point of the write pole, and then removing the mask structure. A trailing shield or a wrap around shield may then be formed around the pole tip. A shield is formed to prevent the main write pole from inadvertently writing to neighboring tracks. The use of bi-layer wrap around shields increases the write field gradient of the main write pole when the shield comprises a lower magnetic moment outer layer surrounding a higher magnetic moment inner layer proximate to the main write pole. The increased write field gradient yields sharper magnetic transitions on the disk and therefore, improves the signal to noise ratio of the disk.

After the read/write heads are formed, the sliders are cut from the wafer into individual sliders, or rows of sliders. The surfaces of the sliders that are exposed when the wafers are cut will eventually form the air bearing surface (ABS) of the slider.

A lapping process is used to form the ABS of a slider, and more particularly, the ABS of the write head. Lapping removes material from the ABS of the slider until specific design parameters of the write head are reached, such as a desired throat height of the wrap around shield. The throat height is a distance between the ABS of the slider and the back edge of the shield. Problems arise, however, when lapping removes materials on the ABS of the slider at different rates. Different materials, such as high and low magnetic moment materials used in fabricating the bi-layer wrap around shields, have different removal rates. More specifically, the high magnetic moment material used for the inner layer of the wrap around shield typically is removed at a lower rate than the lower magnetic moment material used for the outer layer of the shield. This results in the high moment inner layer protruding from the ABS above the other layers on the ABS. This protrusion reduces the clearance for the slider during disk operation, and therefore, increases the potential for head to disk contact. Thus, an ongoing need exists for improving write heads that include bi-layer wrap around shields.

SUMMARY

Embodiments provided herein describe magnetic write heads and corresponding fabrication methods for improved bi-layer wrap around shields having dissimilar shield layer widths and coplanar back edges. A gap structure is formed around a main write pole for a magnetic write head. A wrap around shield for the main write pole is formed to include a first magnetic layer proximate to the main write pole and a second magnetic layer on the first magnetic layer. A first width of the first magnetic layer is less than a second width of the second magnetic layer, and back edges of the first and the second magnetic layers are coplanar. The narrow first magnetic layer reduces the protrusion area of the first magnetic layer out of the ABS of the write head, thus reducing the potential for head to disk contact. Further, a throat height of the wrap around shield is maintained between the first and the second magnetic layers because their back edges are coplanar.

One embodiment is a magnetic write head comprising a main write pole and a gap structure for the main write pole. The magnetic write head further comprises a wrap around shield for the main write pole. The wrap around shield includes a first magnetic layer proximate to the main write pole having a first width, and a second magnetic layer on the first magnetic layer having a second width, where the first width of the first magnetic layer is less than the second width of the second magnetic layer. Further, the back edges of the first and the second magnetic layers are coplanar.

Another embodiment comprises a method of fabricating a magnetic write head. According to the method, a main write pole and a gap structure for the main write pole are formed. A wrap around shield for the main write pole is formed. To form the wrap around shield, a first magnetic layer is formed proximate to the main write pole having a first width. A second magnetic layer is formed on the first magnetic layer having a second width, where the first width of the first magnetic layer is less than the second width of the second magnetic layer. A removal process is performed which removes a portion of the first magnetic layer exposed by the second magnetic layer to define back edges of the first and the second magnetic layers that are coplanar.

Another embodiment comprises another method of fabricating a magnetic write head. According to the method, a main write pole and a gap structure for the main write pole are formed. A wrap around shield for the main write pole is formed. To form the wrap around shield, a first magnetic layer is formed proximate to the main write pole having a first width. A second magnetic layer is formed on the first magnetic layer having a second width, where the first width of the first magnetic layer is less than the second width of the second magnetic layer, and where the back edges of the first and the second magnetic layers are coplanar.

Other exemplary embodiments may be described below.

DESCRIPTION OF THE DRAWINGS

Some embodiments of the present invention are now described, by way of example only, and with reference to the accompanying drawings. The same reference number represents the same element or the same type of element on all drawings.

DESCRIPTION OF EMBODIMENTS

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

Figure 1:
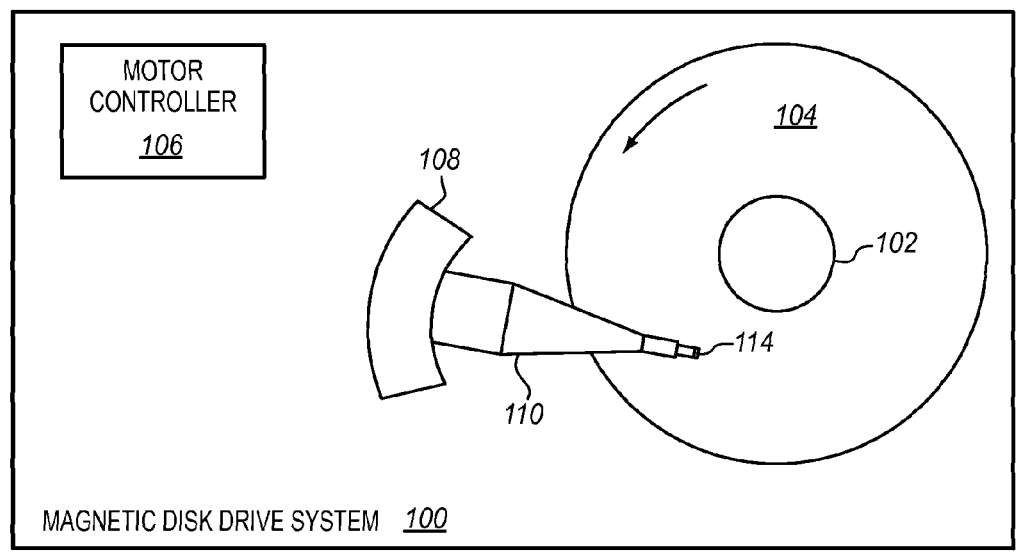
FIG. 1 illustrates a typical magnetic disk drive system.

FIG. 1 illustrates a typical magnetic disk drive system 100. Magnetic disk drive system 100 includes a spindle 102, a magnetic recording disk 104, a motor controller 106, an actuator 108, an actuator/suspension arm 110, and a slider 114. Spindle 102 supports and rotates magnetic recording disk 104 in the direction indicated by the arrow. A spindle motor (not shown) rotates spindle 102 according to control signals from motor controller 106. Slider 114 is supported by actuator/suspension arm 110. Actuator/suspension arm 110 is connected to actuator 108 that moves in order to position slider 114 over a desired track of magnetic recording disk 104. Magnetic disk drive system 100 may include other devices, components, or systems not shown in FIG. 1. For instance, a plurality of magnetic disks, actuators, actuator/suspension arms, and sliders may be used.

When magnetic recording disk 104 rotates, an air flow generated by the rotation of magnetic disk 104 causes an air bearing surface (ABS) of slider 114 to ride on a cushion of air at a particular height above magnetic disk 104. As slider 114 rides on the cushion of air, actuator 108 moves actuator/suspension arm 110 to position a read element (not shown) and a write element (not shown) in slider 114 over selected tracks of magnetic recording disk 104.

Figure 2:
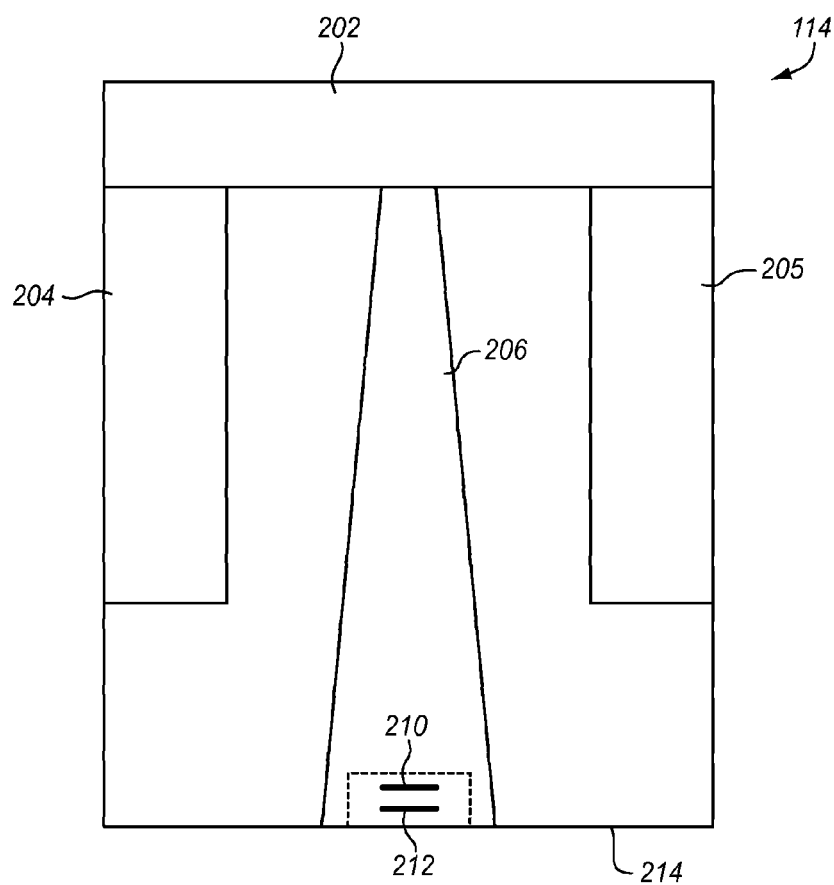
FIG. 2 is an ABS view illustrating a typical slider.

FIG. 2 illustrates a typical slider 114. The view of slider 114 is of the ABS side of slider 114, which is the surface of the page in FIG. 2. Slider 114 has a cross rail 202, two side rails 204-205, and a center rail 206 on the ABS side. The rails on slider 114 illustrate just one embodiment, and the configuration of the ABS side of slider 114 may take on any desired form. Slider 114 also includes a write head 210 and a read head 212 on a trailing edge 214 of slider 114.

Figure 3:
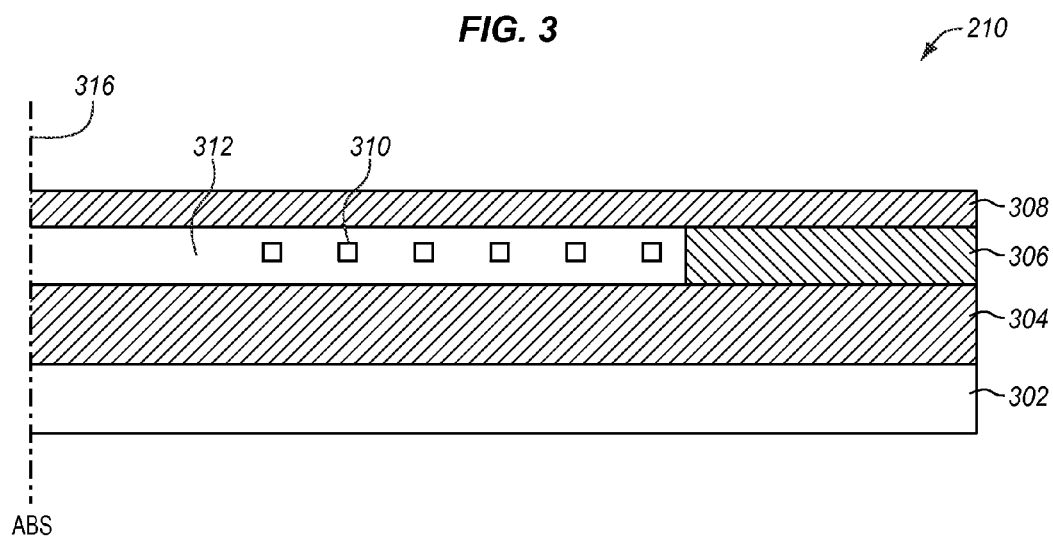
FIG. 3 is a cross-sectional view of a typical write head.

FIG. 3 is a cross-sectional view of a typical write head 210. This view of write head 210 illustrates some of the layers that form write head 210. Write head 210 includes a return pole 304 that is formed on a non-magnetic layer 302. Non-magnetic layer 302 is generally a layer between write head 210 and read head 212 (not shown in this view). Write head 210 further includes a main write pole 308 (or main pole). Main write pole 308 is comprised of a yoke portion (not visible in this view) and a pole tip (also not visible in this view). The pole tip is located proximate to an ABS 316 of recording head 114 and extends inward from ABS 316 to connect with the yoke portion of main write pole 308. Main write pole 308 and return pole 304 are connected to each other through a back gap layer 306. An inductive coil 310 is sandwiched within an insulation layer 312 between the poles 304 and 308. The rest of coil 310 is not shown in this view as it extends further back (i.e., to the right in this view) in write head 210, although coil 310 may wrap around return pole 304 or main write pole 308 as a matter of design choice. Write head 210 may include other layers not shown, and may take on other configurations in other embodiments. For instance, a trailing shield or a wrap around shield may be formed around the pole tip to reduce cross-track interference when writing data using write head 210.

Figure 4:
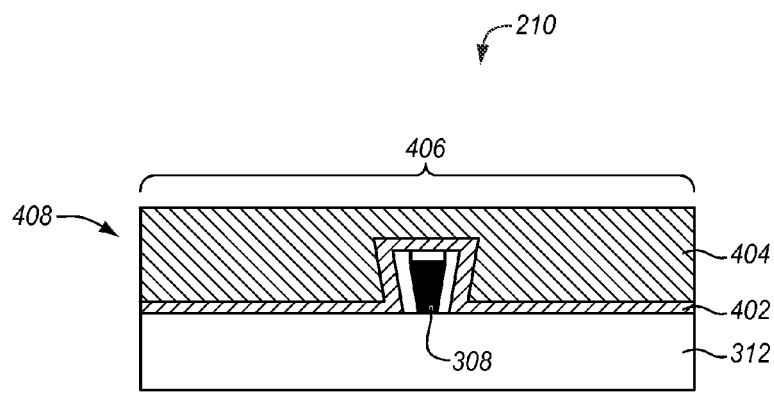
FIG. 4 is a cross-sectional view illustrating a typical write head including a bi-layer wrap around shield having equal shield layer widths.

FIG. 4 is a cross-sectional view illustrating typical write head 210 including a bi-layer wrap around shield 408 having equal shield layer widths. In FIG. 4, shield 408 includes an inner layer 402 and an outer layer 404. Inner layer 402 is proximate to main write pole 308 along pole tip 314. Both inner layer 402 and outer layer 404 have a width 406 which is equal. As discussed in the background, shield 408 may include inner layer 402 (proximate to the write pole) and outer layer 404 (on the inner layer) to increase the write field gradient of write head 210. Problems arise during fabrication when inner layer 402 protrudes above the ABS of write head 210 along width 406 of shield 408. The protrusion presents a large potential contact area for slider 114 and reduces the clearance for slider 114 along this area.

Figure 5:
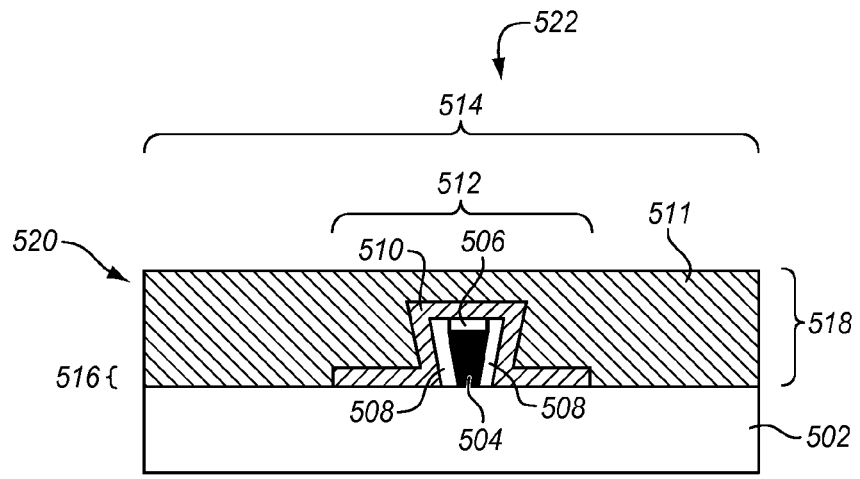
FIGS. 5 and 6 are cross-sectional and top views, respectively, illustrating a write head including a bi-layer wrap around shield having a narrow first layer width and coplanar back edges in an exemplary embodiment.
Figure 6:
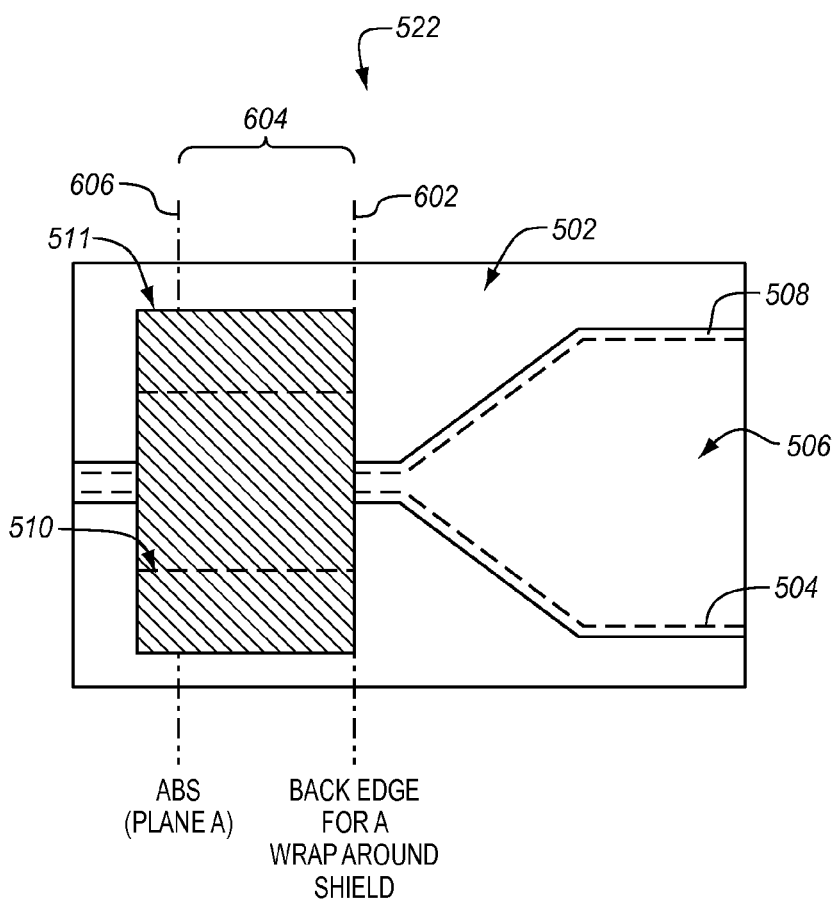

FIGS. 5 and 6 are cross-sectional and top views, respectively, illustrating a write head 522 including a bi-layer wrap around shield 520 having a narrow first layer 510 width 512 and coplanar back edge 602 in an exemplary embodiment. The cross-sectional view of write head 522 (FIG. 5) is taken along plane A of an ABS 606 (see FIG. 6 for an indication of ABS 606). Thus, ABS 606 indicates a future ABS for write head 522 after performing a lapping process. In FIG. 6, this lapping process would remove material from left to right until ABS 606 is reached. Referring to FIG. 5, write head 522 includes a main write pole 504, a gap structure 506 and 508, and a wrap around shield 520 for main write pole 504 fabricated on a non-magnetic layer 502 (e.g., alumina). In write head 522, a first width 512 of first layer 510 for wrap around shield 520 is less than a second width 514 of a second layer 511 for wrap around shield 520. Because first width 512 of first layer 510 is less than second width 514 of second layer 511, first layer 510 protrudes from the ABS of write head 522 along a much smaller potential contact area than write head 210. For example, when wrap around shield 408 has inner and outer layers 402 and 404 having the same width 406 such as illustrated in FIG. 4, the inner layer 402 of shield 408 may protrude along the width 406 of shield 408 after a lapping process is performed to define ABS 316 (see FIG. 3). In some cases, this protrusion may be substantial. For example, when a bi-layer wrap around shield has a width of one hundred microns, then the protrusion of the inner layer would extend one hundred microns along the surface of the ABS. In write head 522, second layer 511 may have second width 514 of about fifty microns. However, first layer 510 may have first width 512 of between about two to four microns. Thus, the protrusion of first layer 510 along the ABS of write head 522 is reduced and therefore provides advantages over the prior art.

In FIG. 5, gap structure 506 and 508 surrounds main write pole 504 and includes a side gap (element 508) and a top gap (element 506). First layer 510 is proximate to main write pole 504 and may have a thickness 516 of between about thirty and two hundred nanometers. In contrast, second layer 511 may have a thickness 518 of between about two and three microns. Thus, first layer 510 is thinner than second layer 511 and also narrower in width than second layer 511. FIG. 6 illustrates an important design parameter for write head 522, which is a throat height 604 for wrap around shield 520. Throat height 604 is defined by a distance between ABS 606 of write head 522 and a back edge 602 for wrap around shield 520. While first layer 510 and second layer 511 may have different widths 512 and 514, back edge 602 for first layer 510 and second layer 511 are coplanar. This ensures that throat height 604 for wrap around shield 520 is fabricated accurately. How back edge 602 for first layer 510 and second layer 511 are defined will become more readily apparent in the subsequent discussions on the fabrication of write head 522.

Referring again to FIG. 6, a number of dashed lines are drawn in the top view of write head 522. The dashed lines indicate features underneath various layers of materials fabricated for write head 522. For example, FIG. 6 shows a dashed outline for main write pole 504. In FIG. 6, main write pole 504 is underneath top gap 506 and surrounded by side gap 508. Dashed lines for first layer 510 in this view also illustrate that second layer 511 is fabricated on first layer 510. The dashed lines allow for various features of write head 522 to be discussed even though such features may be hidden by other layers for write head 522.

Figure 7:
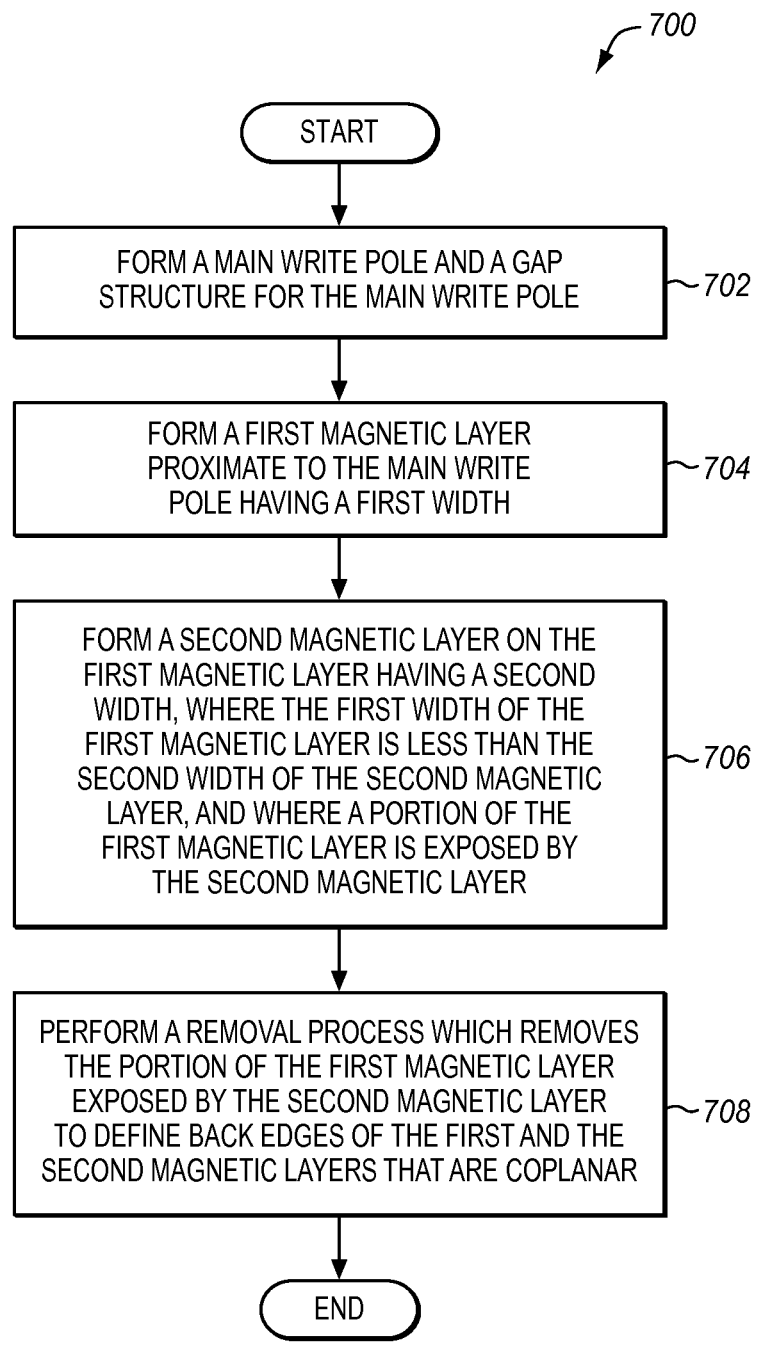
FIG. 7 is a flow chart illustrating a method of fabricating the magnetic write head of FIGS. 5 and 6 in an exemplary embodiment.

FIG. 7 is a flow chart illustrating a method 700 of fabricating magnetic write head 522 of FIGS. 5 and 6 in an exemplary embodiment. The steps of the flow charts provided herein are not all inclusive and other steps, not shown, may be included. Further, the steps may be performed in an alternative order. Further, write head 522 may be fabricated on a number of pre-existing layers of a wafer, such as layers forming a read head. While the following discussion details the fabrication of one write head 522 on a wafer, one skilled in the art understands that fabricating write heads is a wafer level fabrication process, and therefore hundreds or even thousands of write heads may be fabricated simultaneously.

Figure 8:
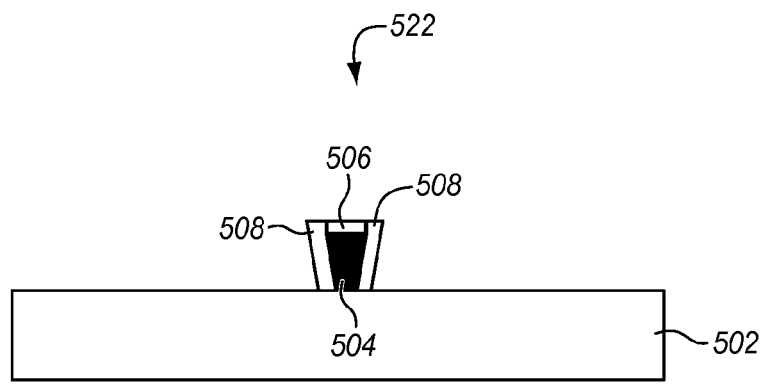
FIGS. 8 and 9 are cross-sectional and top views, respectively, illustrating the write head after forming the main write pole and a gap structure for the main write pole according to a step of the method of FIG. 7.
Figure 9:
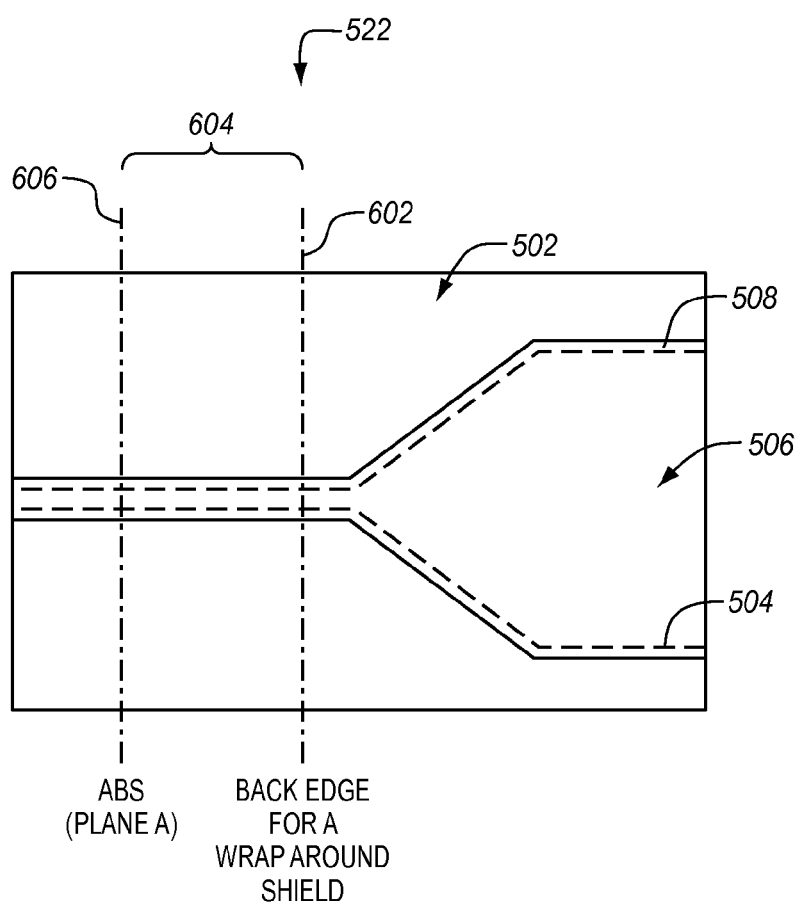

Step 702 of FIG. 7 comprises forming main write pole 504 and gap structure 506 and 508 for main write pole 504. FIGS. 8 and 9 are cross-sectional and top views, respectively, illustrating write head 522 after forming main write pole 504 and gap structure 506 and 508. When forming main write pole 504 and gap structure 506 and 508, one skilled in the art understands that a number of fabrication steps have been omitted for brevity in arriving at the resulting FIGS. 8 and 9. Such omitted steps may include depositing magnetic material (e.g., NiFe, CoFe, etc.) for main write pole 504, forming one or more mask structures for defining main write pole 504, performing a milling process to remove magnetic material and to define main write pole 504, etc. Additional steps may include depositing gap material (e.g., alumina) for a side gap and a top gap to form gap structure 506 and 508.

Figure 10:
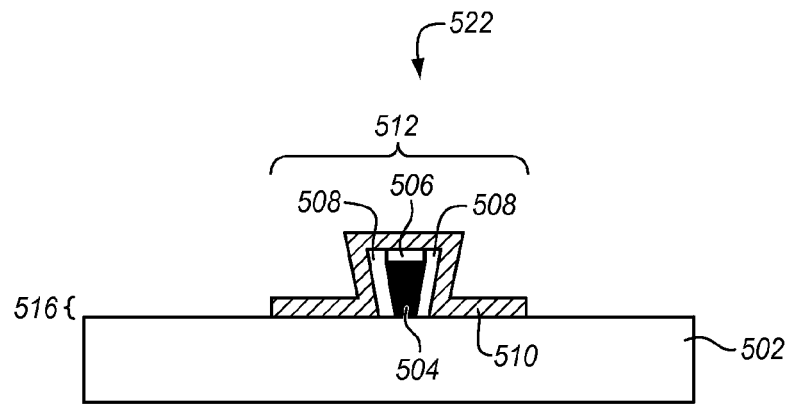
FIGS. 10 and 11 are cross-sectional and top views, respectively, illustrating the write head after forming a first magnetic layer for a wrap around shield according to a step of the method of FIG. 7.
Figure 11:
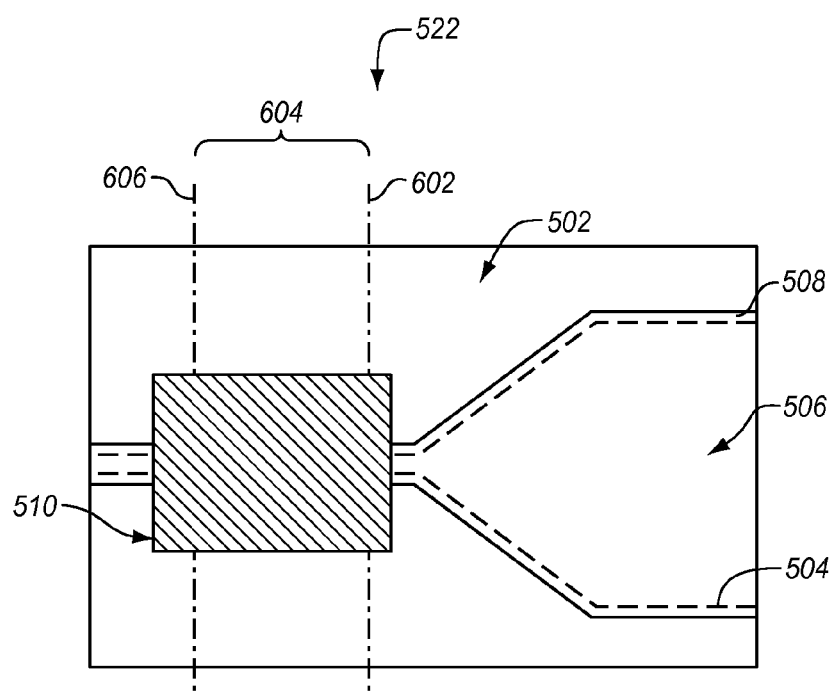

Step 704 of FIG. 7 comprises forming first layer 510 for wrap around shield 520 (see FIG. 5). FIGS. 10 and 11 are cross-sectional and top views, respectively, illustrating write head 522 after forming first layer 510. FIG. 11 illustrates the relative location of first layer 510 with respect to ABS 606 and back edge 602. More particularly, FIG. 11 illustrates how first layer 510, when formed, extends to the right of back edge 602. How the placement of first layer 510 will be used to form a back edge for first layer 510 will become more apparent in subsequent fabrication steps and the related discussion below. FIG. 10 also illustrates how first layer 510 is formed around the pole tip for main write pole 504, and is isolated from write pole 504 by gap structure 506 and 508. Forming first layer 510 may include electroplating or sputter depositing a high magnetic moment CoFeNi magnetic material to a thickness 516 of between about thirty nanometers and one hundred nanometers. Further, forming first layer 510 may include a number of depositing, masking, and etching steps not shown.

Figure 12:
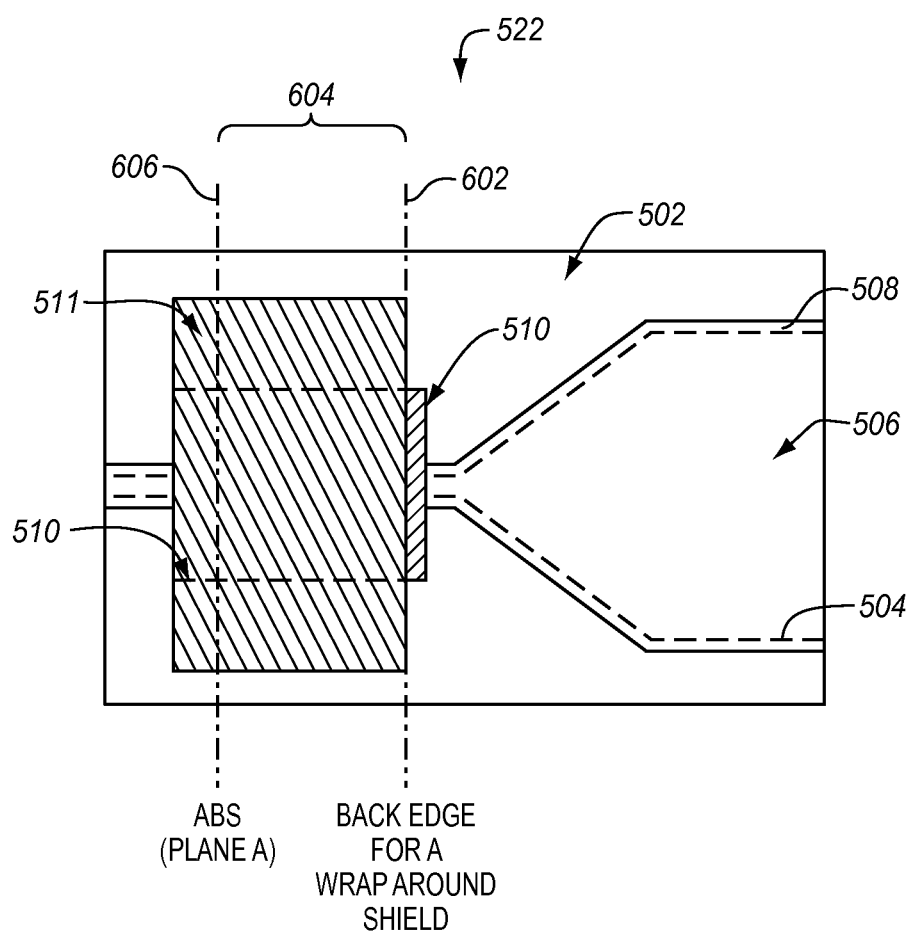
FIG. 12 is a top view illustrating the write head after forming a second magnetic layer for the wrap around shield according to a step of the method of FIG. 7.

Step 706 of FIG. 7 comprises forming second layer 511 on first layer 510 for wrap around shield 520, where first width 512 of first layer 510 is less than second width 514 (see FIG. 5) of second layer 511. FIG. 12 is a top view illustrating write head 522 after forming second layer 511 for wrap around shield 520. Referring to FIG. 12, second layer 511 covers first layer 510 (as indicated for the dashed lines for first layer 510) up to a back edge for second layer 511 as shown along the line for back edge 602. Note that a portion of first layer 510 remains exposed in FIG. 12 by second layer 511. Forming second layer 511 may include electroplating or sputter depositing a lower magnetic moment (relative to the magnetic moment of first layer 510) CoFeNi material to a thickness 518 of between about two and three microns. Further, forming second layer 511 may include a number of depositing, masking, and etching steps not shown.

Step 708 of FIG. 7 comprises performing a removal process which removes portions of first layer 510 exposed by second layer 511 to define back edge 602 of first layer 510 and second layer 511 that are coplanar. Referring to the top view shown in FIG. 12, a removal process (e.g., ion milling) is performed on write head 522 to remove a portion of first layer 510 to the right of back edge 602. During the removal process, second layer 511 forms a mask protecting first layer 510. When the exposed portion of first layer 510 is removed, back edge 602 for first layer 510 and second layer 511 are defined such that they are coplanar. This allows for a desired throat height 604 for wrap around shield 520. FIGS. 5 and 6 are the result of performing step 708.

Figure 13:
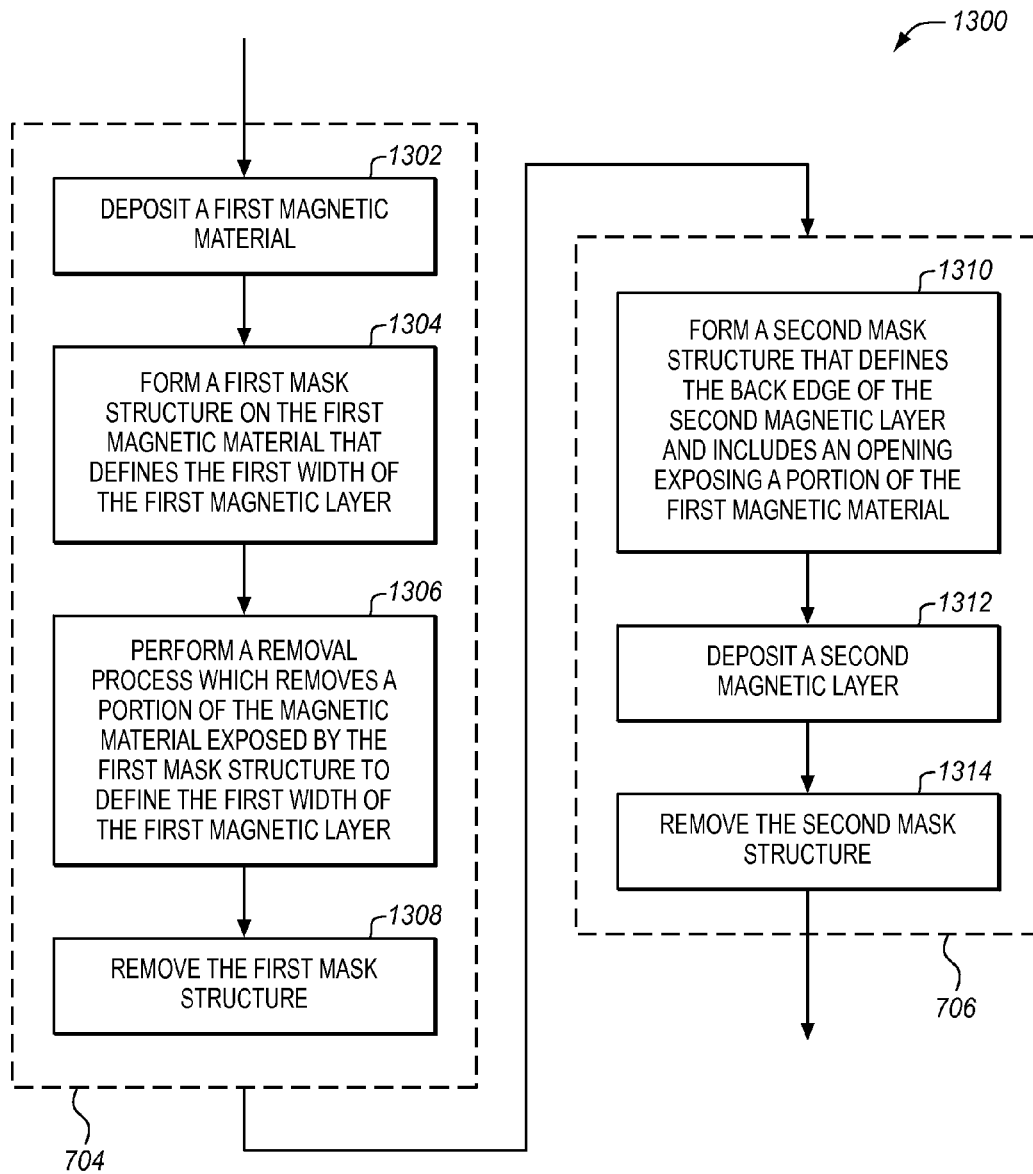
FIG. 13 is a flow chart illustrating additional steps for the method of FIG. 7 in an exemplary embodiment.

FIG. 13 is a flow chart illustrating additional steps for method 700 of FIG. 7 in an exemplary embodiment. More particularly, the flow chart of FIG. 13 will illustrate additional details for step 704 of method 700 (forming first layer 510, as shown in steps 1302-1308 of FIG. 13) and additional details for step 706 of method 700 (forming second layer 511, as shown in steps 1310-1314 of FIG. 13).

Figure 14:
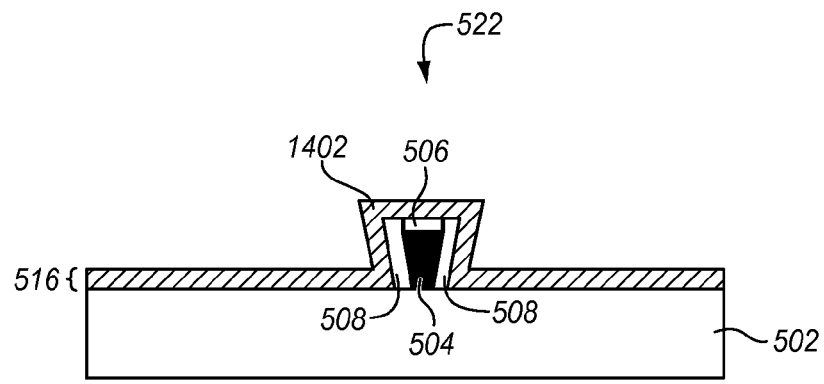
FIGS. 14 and 15 are cross-sectional and top views, respectively, illustrating the write head after depositing a first magnetic material for the wrap around shield according to a step of the method of FIG. 13.
Figure 15:
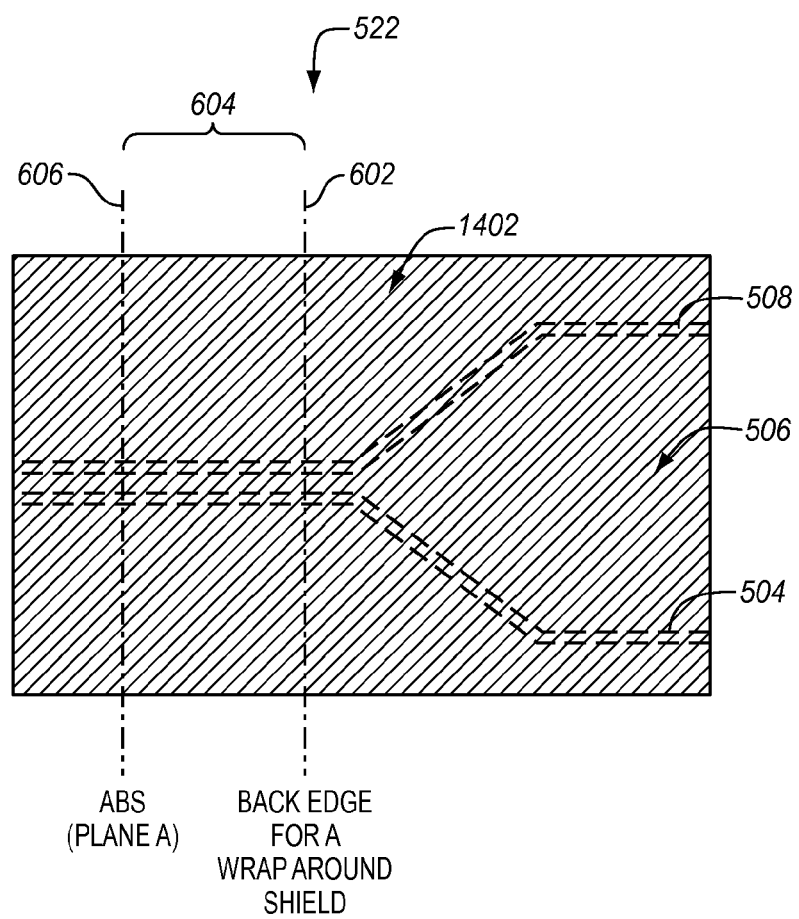

Step 1302 of FIG. 13 comprises depositing a first magnetic material for wrap around shield 520. Prior to depositing the first magnetic material, a Ta/Ru seed layer may be deposited to a thickness of between about twenty and thirty nanometers. FIGS. 14 and 15 are cross-sectional and top views, respectively, illustrating write head 522 after depositing a first magnetic material 1402 for wrap around shield 520. The top view of write head 522 shown in FIG. 15 illustrates that first magnetic material 1402 is a full film deposition process. First magnetic material 1402 (e.g., CoFeNi) covers gap structure 506 and 508 and also covers non-magnetic layer 502 to a thickness 516. Thickness 516 may be between about thirty nanometers and one hundred nanometers.

Figure 16:
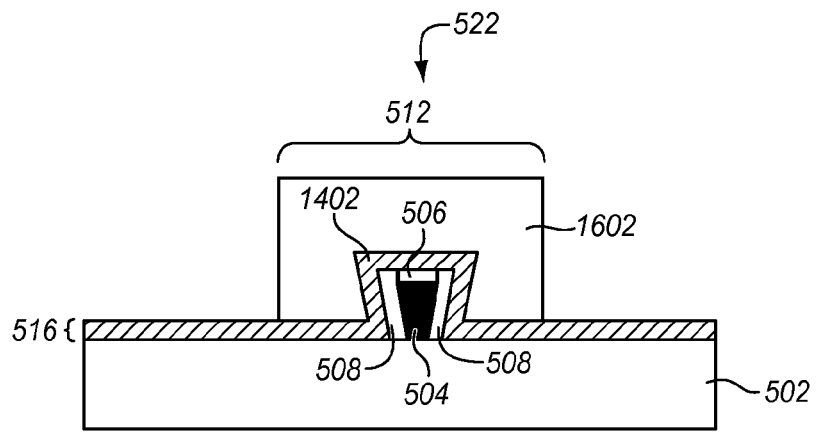
FIGS. 16 and 17 are cross-sectional and top views, respectively, illustrating the write head after forming a first mask structure on the first magnetic material that defines a width of the first magnetic layer according to a step of the method of FIG. 13.
Figure 17:
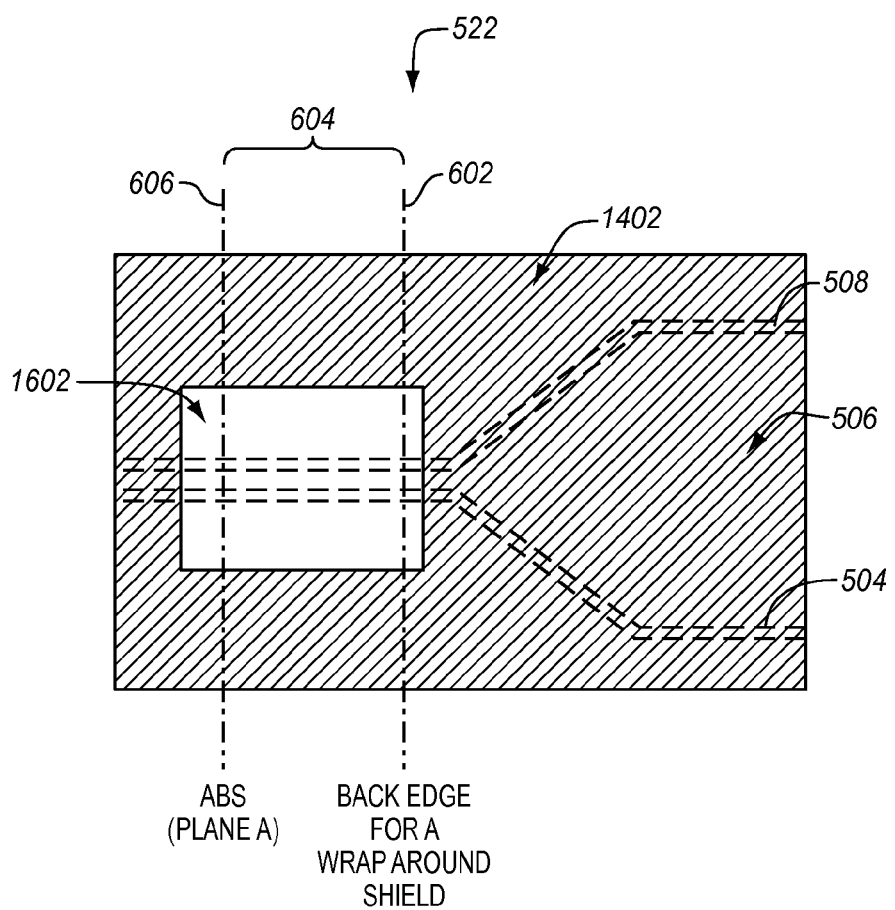

Step 1304 of FIG. 13 comprises forming a first mask structure on first magnetic material 1402 that defines first width 512 of first layer 510. FIGS. 16 and 17 are cross-sectional and top views, respectively, illustrating write head 522 after forming a first mask structure 1602 on first magnetic material 1402 that defines first width 512 of first layer 510. First mask structure 1602 may include a hard mask (not shown), an image transfer mask (not shown), and a resist layer (not shown). In FIGS. 16 and 17, first mask structure 1602 has already been photo patterned to define width 512. The top view of FIG. 17 illustrates the placement of first mask structure 1602 relative to back edge 602.

Figure 18:
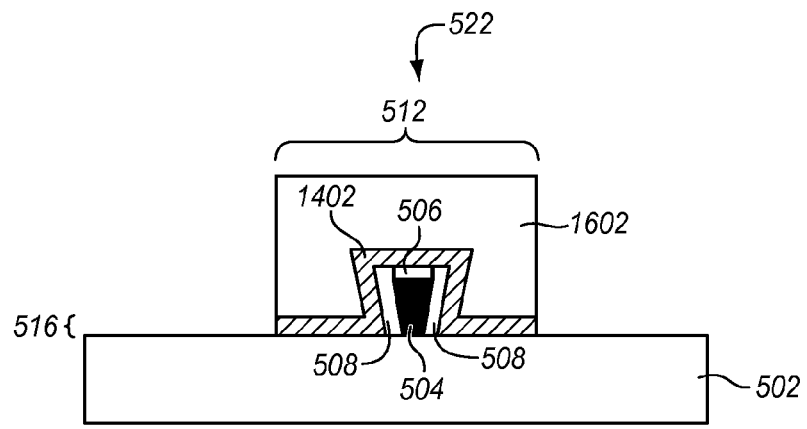
FIGS. 18 and 19 are cross-sectional and top views, respectively, illustrating the write head after performing a removal process which removes portions of the magnetic material exposed by the first mask structure to define the width of the first magnetic layer according to a step of the method of FIG. 13.
Figure 19:
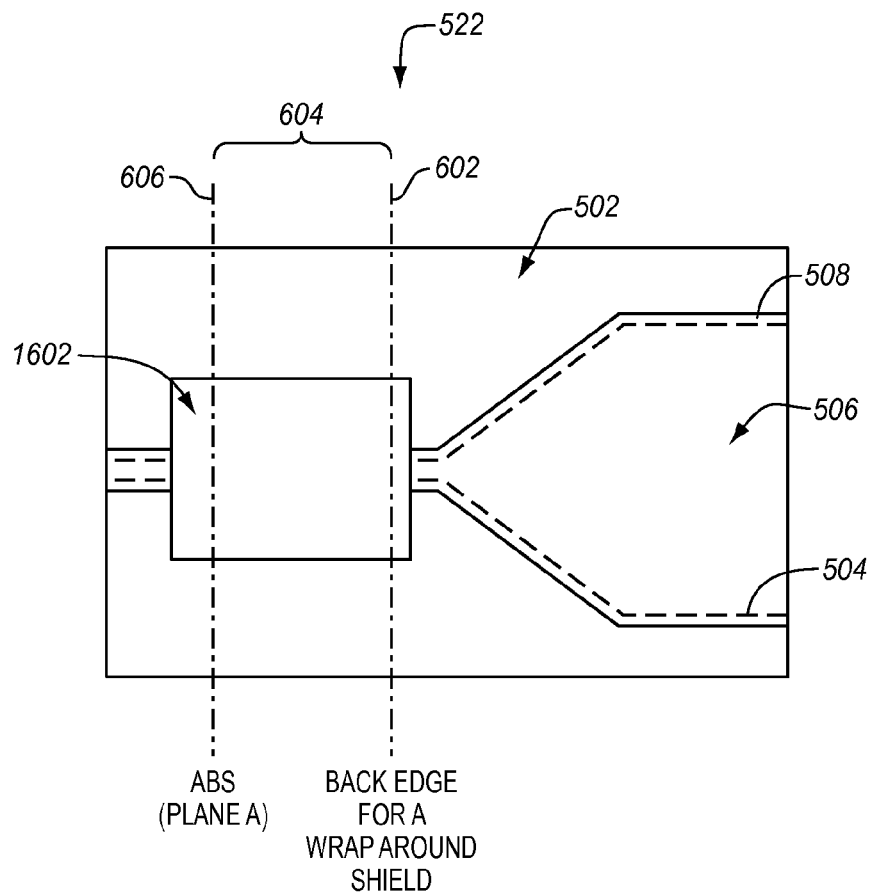

Step 1306 of FIG. 13 comprises performing a removal process which removes a portion of magnetic material 1402 exposed by first mask structure 1602 to define first width 512 of first layer 510 (see FIG. 5). FIGS. 18 and 19 are cross-sectional and top views, respectively, illustrating write head 522 after performing a removal process which removes a portion of magnetic material 1402 exposed by first mask structure 1602 to define first width 512 of first layer 510.

Figure 20:
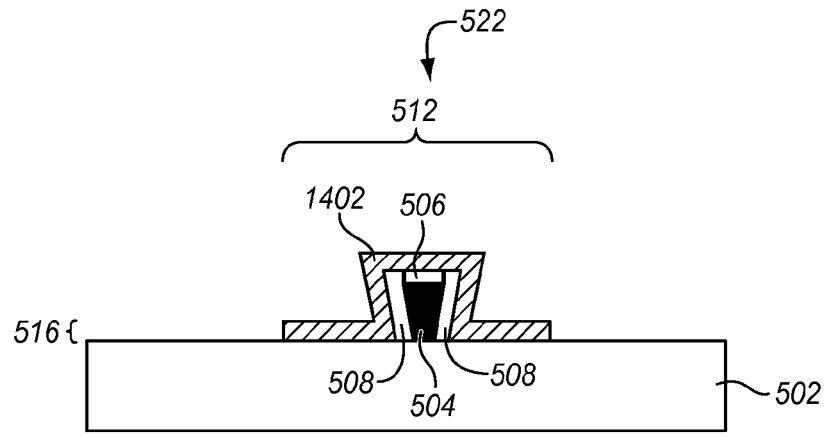
FIGS. 20 and 21 are cross-sectional and top views, respectively, illustrating the write head after removing the first mask structure according to a step of the method of FIG. 13.
Figure 21:
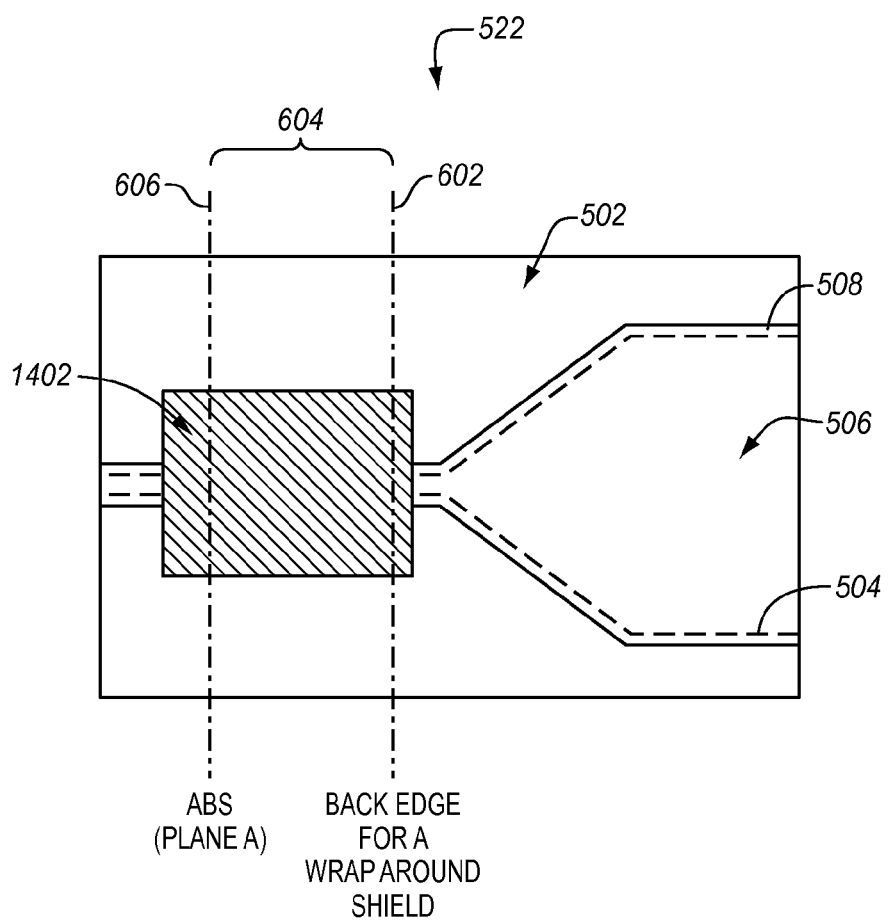

Step 1308 of FIG. 13 comprises removing first mask structure 1602. FIGS. 20 and 21 are cross-sectional and top views, respectively, illustrating write head 522 after removing first mask structure 1602. After removing first mask structure 1602, first magnetic material 1402 may be re-capped with between about three and eight nanometers of CoFeNi material.

Figure 22:
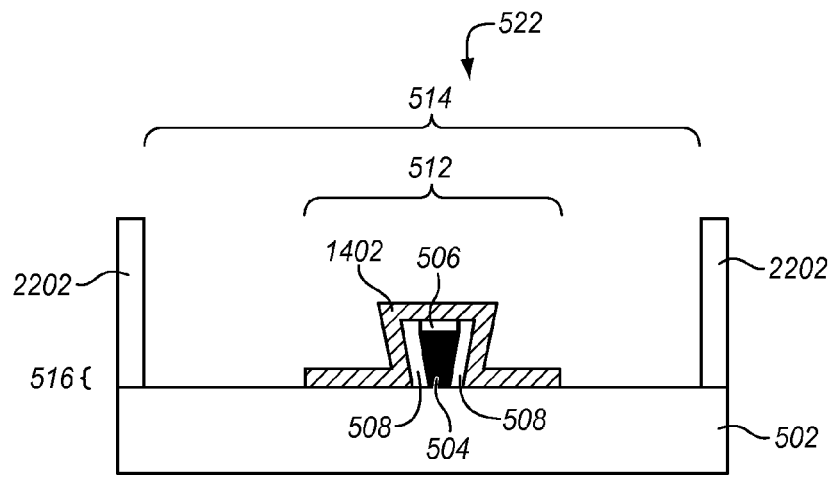
FIGS. 22 and 23 are cross-sectional and top views, respectively, illustrating the write head after forming a second mask structure that defines the back edge of the second magnetic layer and includes an opening exposing a portion of the first magnetic material according to a step of the method of FIG. 13.
Figure 23:
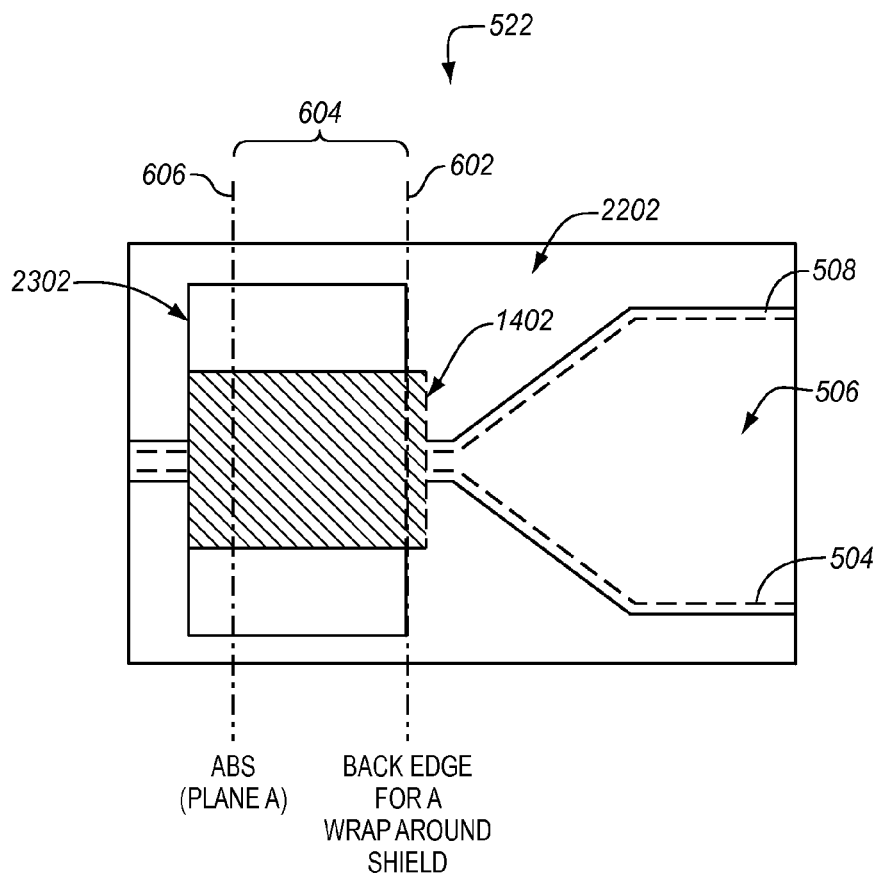

Step 1310 of FIG. 13 comprises forming a second mask structure that defines a back edge of second magnetic layer 511 and includes an opening exposing a portion of first magnetic material 1402. FIGS. 22 and 23 are cross-sectional and top views, respectively, illustrating write head 522 after forming a second mask structure 2202 that defines a back edge (disposed along back edge 602) of a second magnetic material and includes an opening 2302 exposing a portion of first magnetic material 1402. Second mask structure 2202 may include a hard mask (not shown), an image transfer mask (not shown), and a resist layer (not shown). In FIGS. 22 and 23, second mask structure 2202 has already been photo patterned to define opening 2302. Opening 2302 will define second width 514 of second layer 511. The top view of FIG. 23 illustrates how second mask structure 2202 covers most of the material of write head 522 in this step, with the exception of material exposed by opening 2302. Some of the material exposed by opening 2302 includes first magnetic material 1402.

Figure 24:
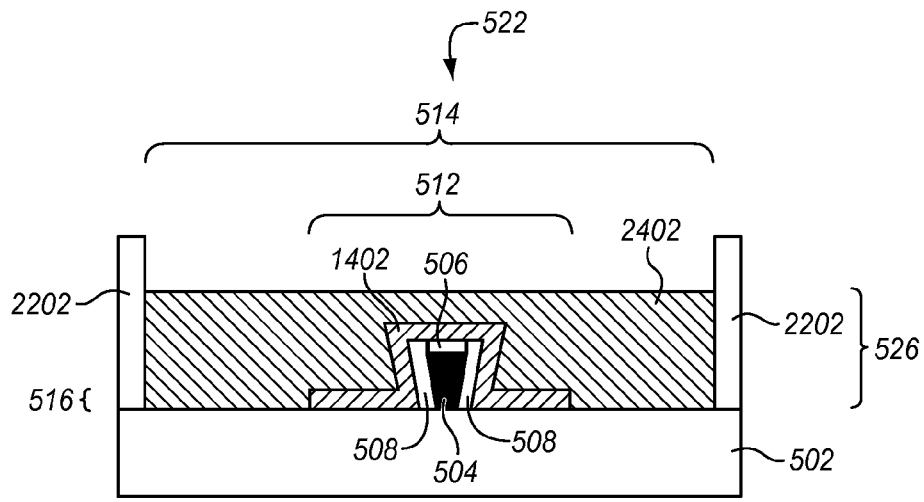
FIGS. 24 and 25 are cross-sectional and top views, respectively, illustrating the write head after depositing a second magnetic layer for the wrap around shield according to a step of the method of FIG. 13.
Figure 25:
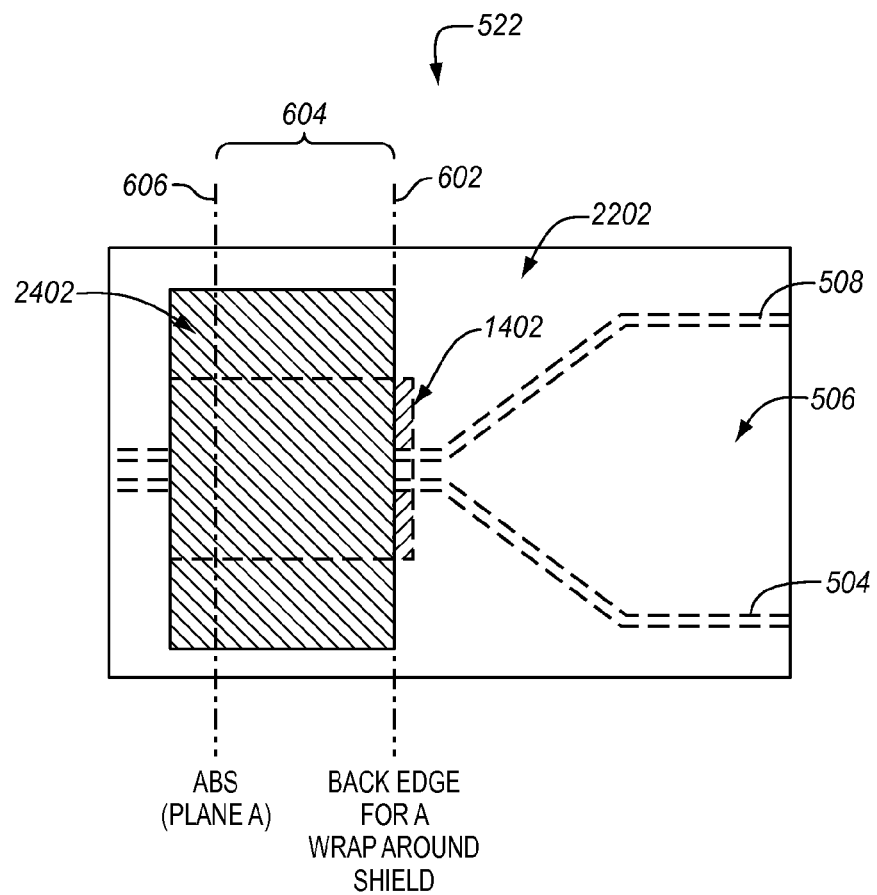

Step 1312 of FIG. 13 comprises depositing a second magnetic material for wrap around shield 520. FIGS. 24 and 25 are cross-sectional and top views, respectively, illustrating write head 522 after depositing a second magnetic material 2402. Second magnetic material 2402 (e.g., CoFeNi) may be deposited by an electroplating process to cover material exposed by opening 2302. Second magnetic material 2402 may also cover second mask structure 2202, but this has been omitted for the sake of clarity. Second magnetic material 2402 may be deposited to thickness 518 of between about two and three microns. Further, the top view of FIG. 25 illustrates that second magnetic material 2402 covers a majority of first magnetic material 1402 and exposes a portion of first magnetic material 1402 to the right of back edge 602. Thus in this step, a back edge of first magnetic material 1402 and a back edge of second magnetic material 2402 are not as yet coplanar.

Figure 26:
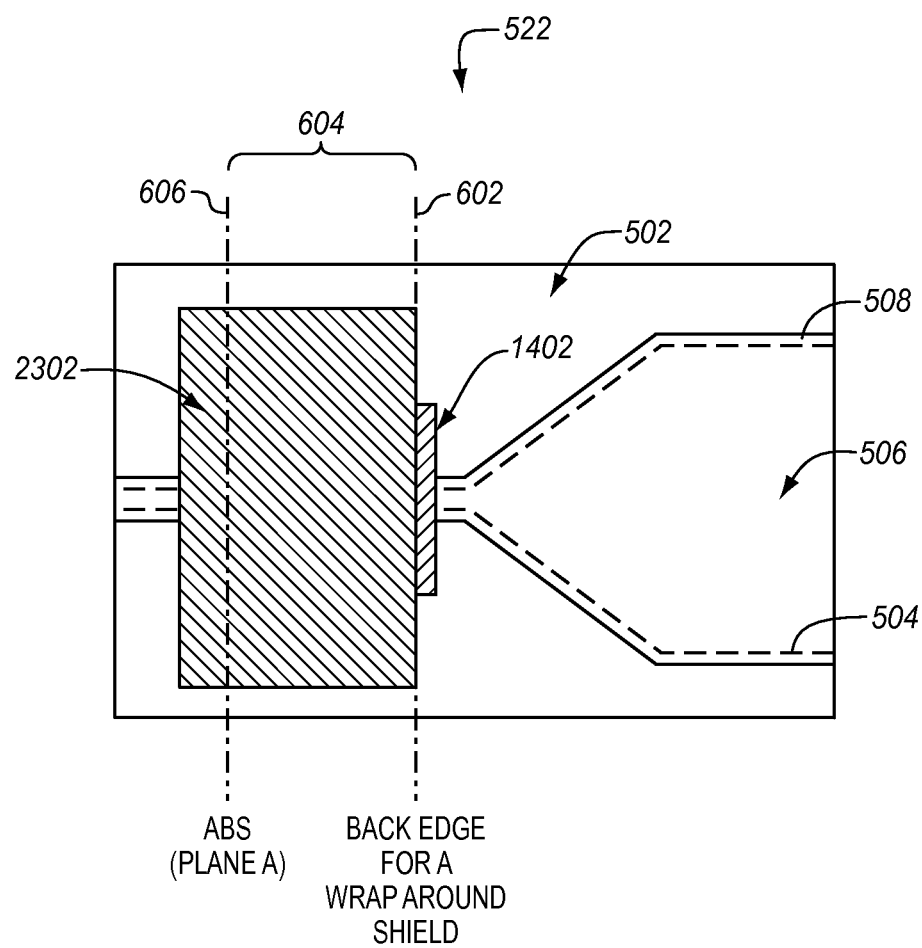
FIG. 26 is a top view after removing the second mask structure according to a step of the method of FIG. 13.

Step 1314 of FIG. 13 comprises removing second mask structure 3302. When removing second mask structure 3302, second magnetic material 2402 attached to second mask structure 2202 will also be removed. FIG. 26 is a top view illustrating write head 522 after removing second mask structure 2202.

After second mask structure 2202 is removed, step 708 of method 700 (see FIG. 7) is performed. A portion of first magnetic material 1402 exposed by second magnetic material 2402 is removed to define back edge 602 for first magnetic material 1402 and second magnetic material 511 such that they are coplanar. FIGS. 5 and 6 are the result of performing step 708 of method 700; first magnetic material 1402 and second magnetic material 2402 are first layer 510 and second layer 511, respectively.

Figure 27:
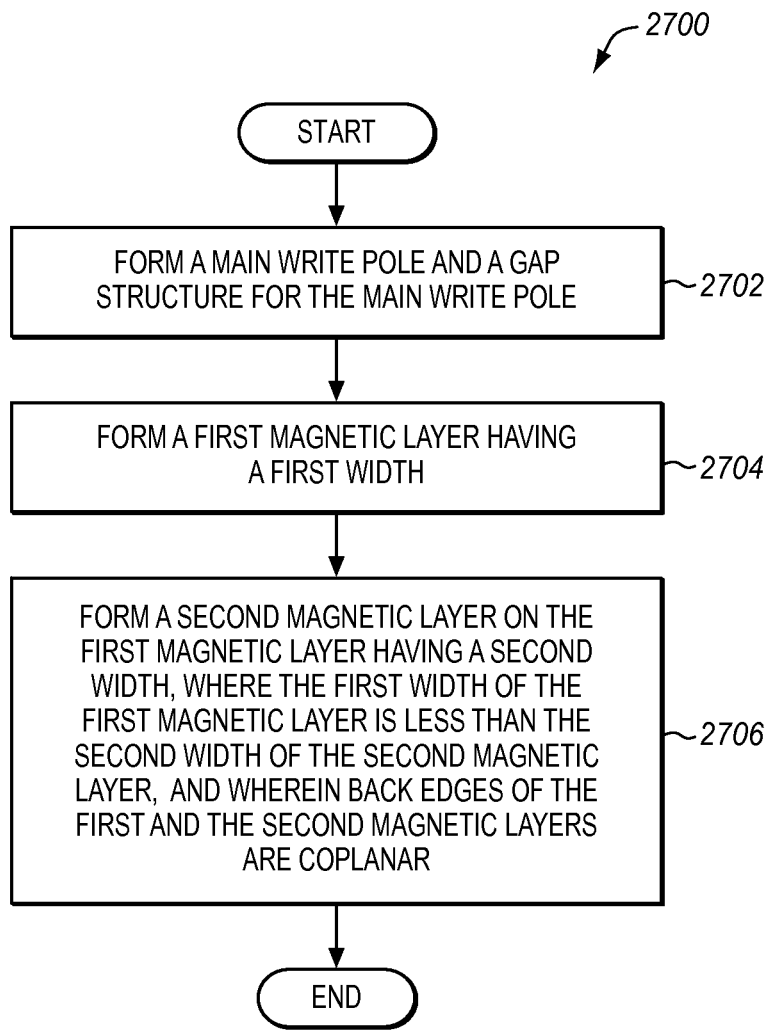
FIG. 27 is a flow chart illustrating another method of fabricating the magnetic write head of FIGS. 5 and 6 in an exemplary embodiment.

FIG. 27 is a flow chart illustrating another method 2700 of fabricating write head 522 of FIGS. 5 and 6 in an exemplary embodiment. In method 700, first and second layers 510-511 were first fabricated to overlap and then second layer 511 was used as a mask during a removal process to create coplanar back edge 602. Method 2700 will illustrate an alternate fabrication process whereby first and second layers 510-511 will formed in place as coplanar layers.

Step 2702 of FIG. 27 comprises forming main write pole 504 and gap structure 506 and 508 for main write pole 504. This step may be substantially similar to step 702 of method 700 and therefore will not be re-iterated here.

Figure 28:
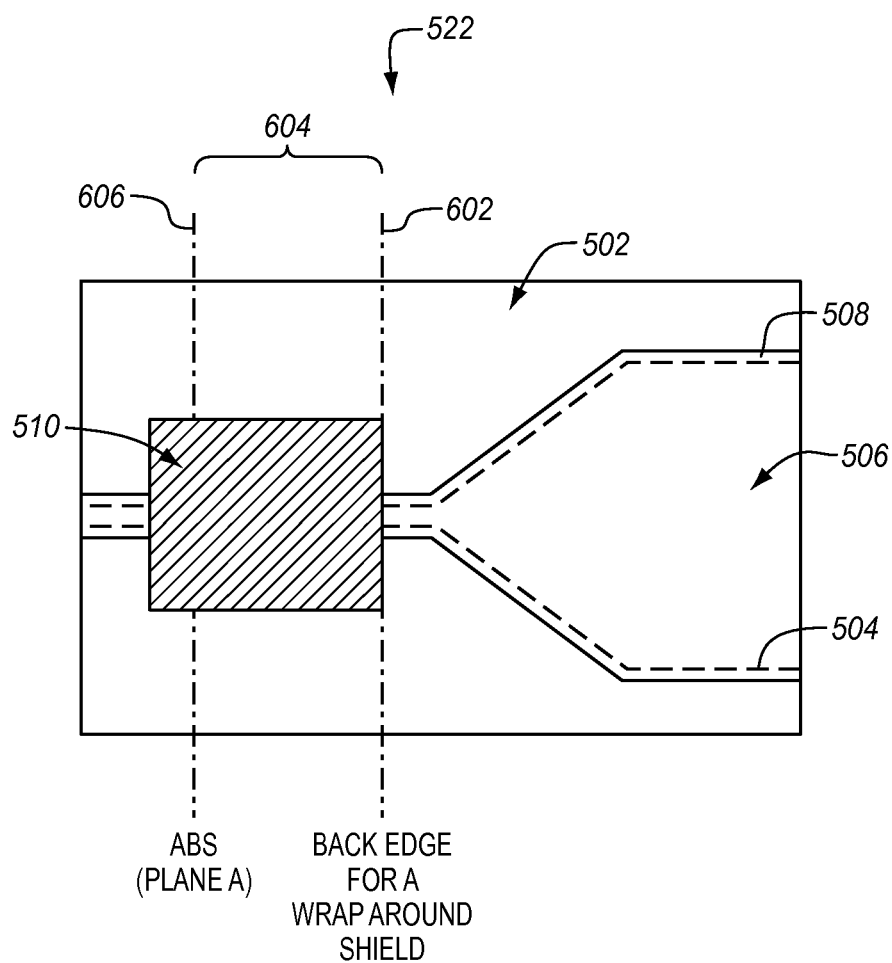
FIG. 28 is a top view illustrating the write head after forming a first magnetic layer for the wrap around shield according to a step of the method of FIG. 27.

Step 2704 of FIG. 27 comprises forming first layer 510. FIG. 28 is a top view illustrating write head 522 after forming first layer. Note that the top view of FIG. 28 illustrates that first layer 510 is deposited to align with back edge 602. This is in contrast to FIG. 12, which illustrates that first layer 510 was formed to be offset across back edge 602 as compared to second layer 511.

Figure 29:
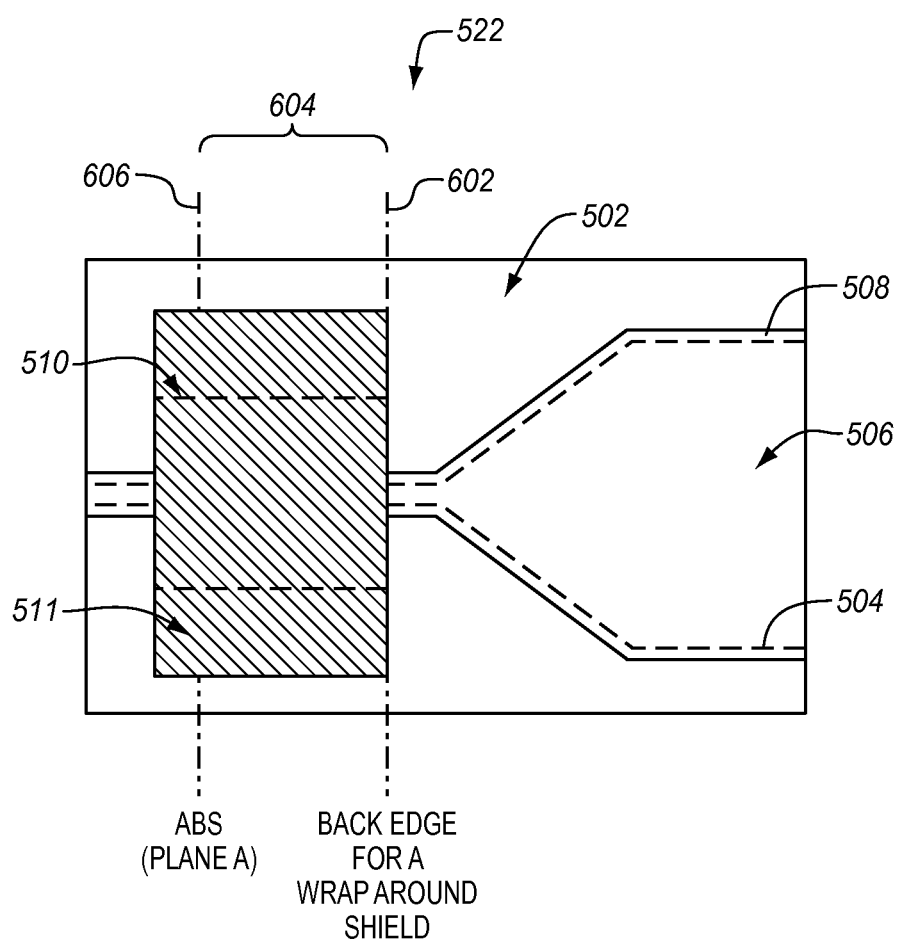
FIG. 29 is a top view illustrating the write head after forming a second magnetic layer for the wrap around shield according to a step of the method of FIG. 27.

Step 2706 of FIG. 27 comprises forming second layer 511 on first layer 510 for wrap around shield 520. FIG. 29 illustrate write head 522 after forming second layer 511. Note that in contrast to method 700, a removal process is not performed to generate back edge 602 that is coplanar for first and second layers 510-511. Instead, first and second layers 510-511 are formed in place as coplanar. FIG. 5 illustrates a cross-sectional view of the result of performing step 1706.

Figure 30:
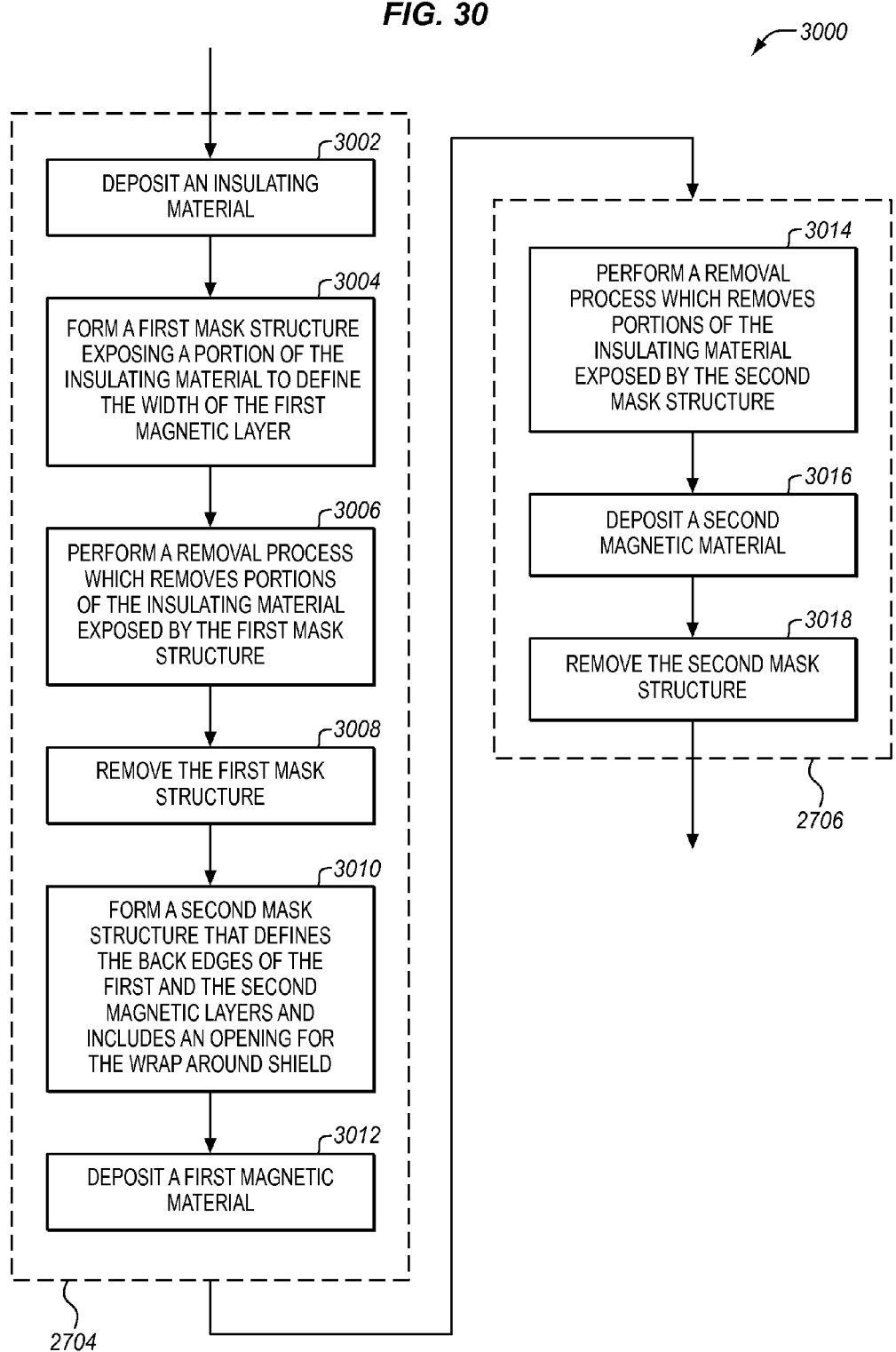
FIG. 30 is a flow chart illustrating additional steps for the method of FIG. 27 in an exemplary embodiment.
Figure 31:
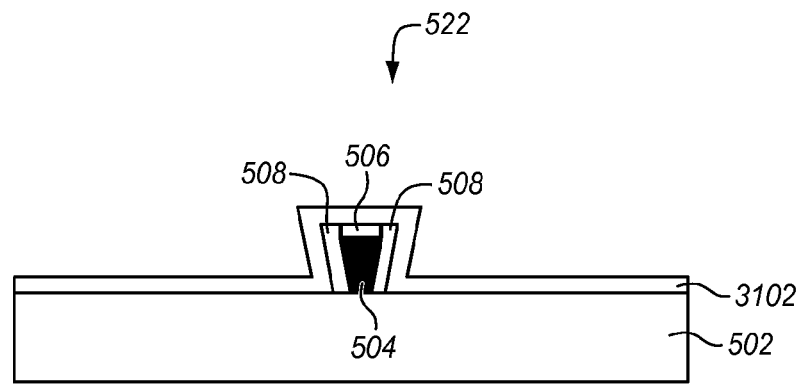
FIGS. 31 and 32 are cross-sectional and top views, respectively, illustrating the write head after depositing an insulating material according to a step of the method of FIG. 30.
Figure 32:
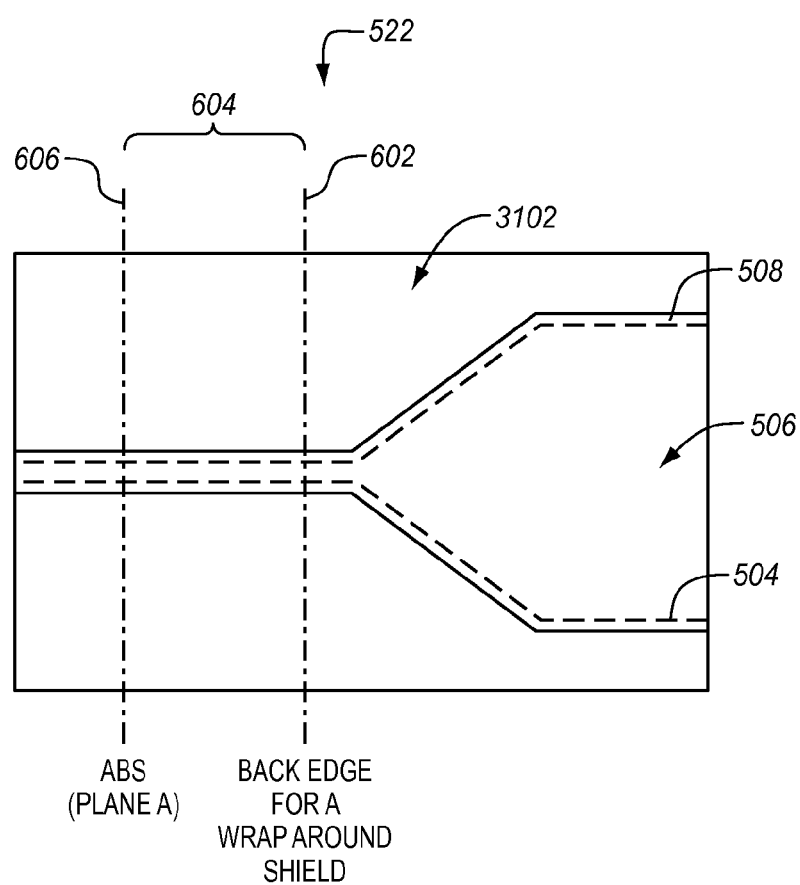

FIG. 30 is a flow chart illustrating additional steps for method 2700 of FIG. 27 in an exemplary embodiment. More particularly, the flow chart of FIG. 30 illustrates additional details for step 2704 of method 2700 (forming first layer 510, as shown in steps 3002-3012 of FIG. 30) and additional details for step 2706 of method 2700 (forming second layer 511, as shown in steps 3014-3018 of FIG. 30). Step 3002 of FIG. 30 comprises depositing an insulating material. Prior to depositing the insulating material, a Ta/Ru seed layer may be deposited. FIGS. 31 and 32 are cross-sectional and top views, respectively, illustrating write head 522 after depositing an insulating material 3102. Insulating material 3102 may be alumina, and is deposited full film. The thickness of insulating material 3102 may be about twenty five nanometers. Thus, insulating material 3102 covers gap structure 506 and 508, and also covers non-magnetic layer 502. This is illustrated in FIG. 32, which shows dashed lines for the structures covered by insulating material 3102.

Figure 33:
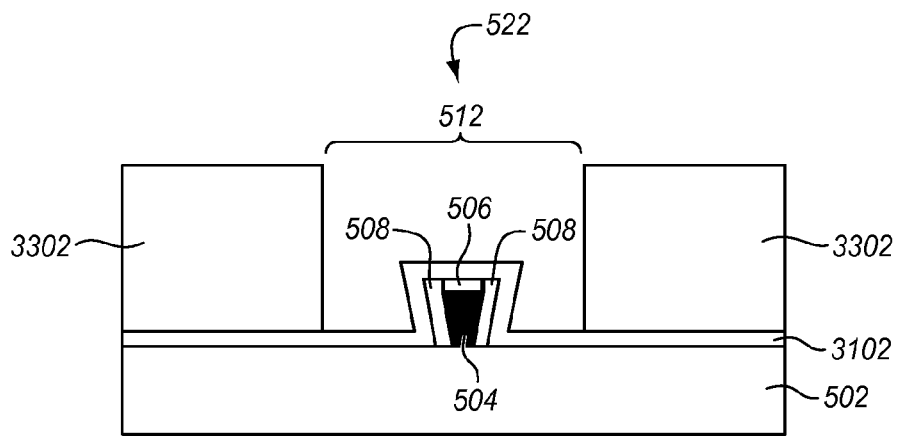
FIGS. 33 and 34 are cross-sectional and top views, respectively, illustrating the write head after forming a first mask structure exposing a portion of the insulating material to define the width of the first magnetic layer according to a step of the method of FIG. 30.
Figure 34:
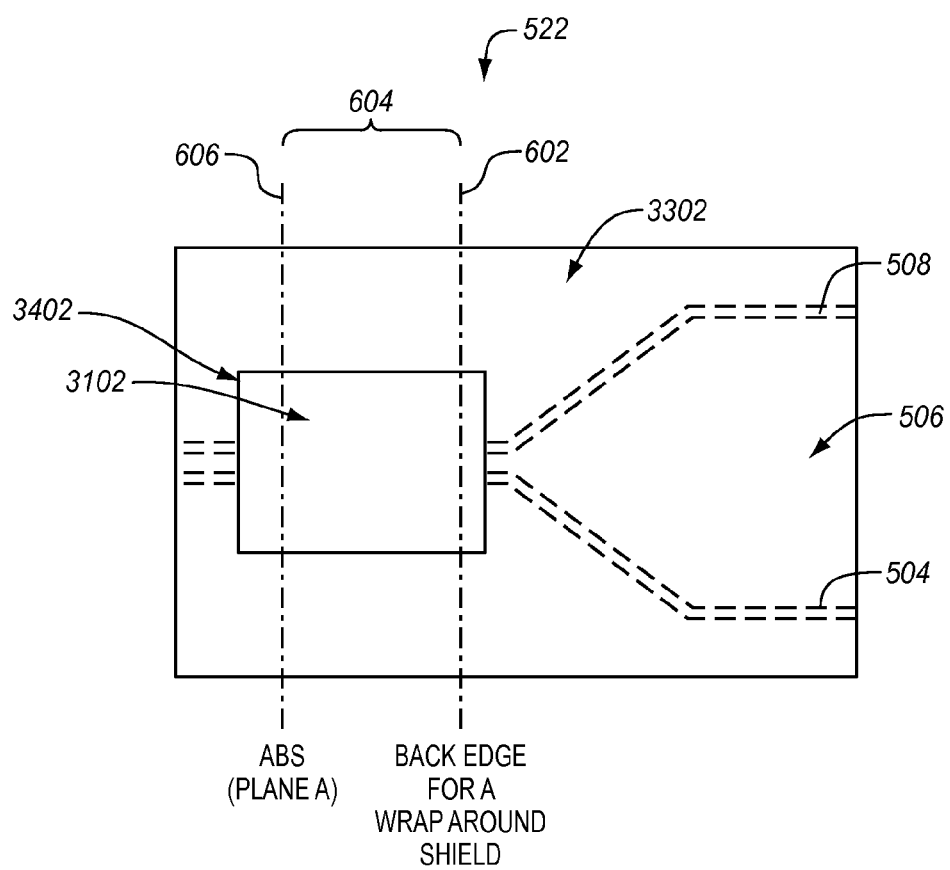

Step 3004 of FIG. 30 comprises forming a first mask structure exposing a portion of insulating material 3102 to define first width 512 of first layer 510. FIGS. 33 and 34 are cross-sectional and top views, respectively, illustrating write head 522 after forming a first mask structure 3202 exposing a portion of insulating material 3102 to define first width 512 of the first layer 510. First mask structure 3302 covers a majority of insulating material 3102 with the exception of a portion proximate to write pole 504 exposed by opening 3402. First mask structure 3302 may include a hard mask (not shown), an image transfer mask (not shown), and a resist layer (not shown). In FIGS. 33 and 34, first mask structure 3302 has already been photo patterned to define opening 3402.

Figure 35:
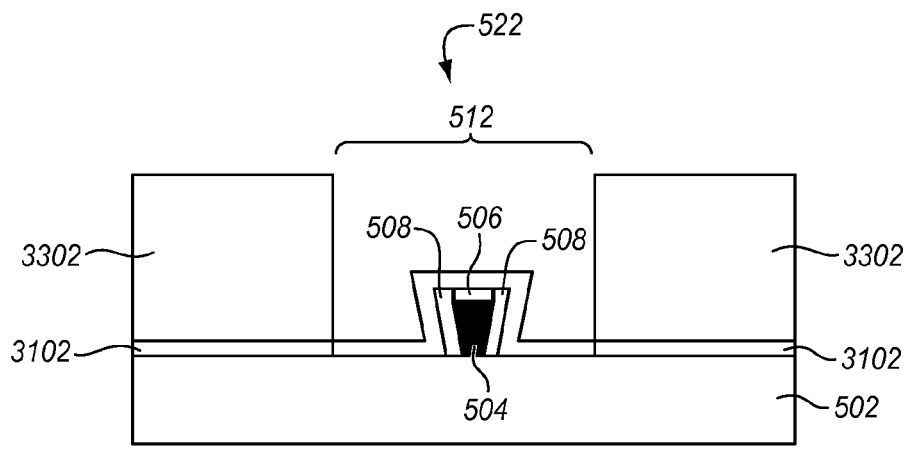
FIGS. 35 and 36 are cross-sectional and top views, respectively, illustrating the write head after performing a removal process which removes portions of the insulating material exposed by the first mask structure according to a step of the method of FIG. 30.
Figure 36:
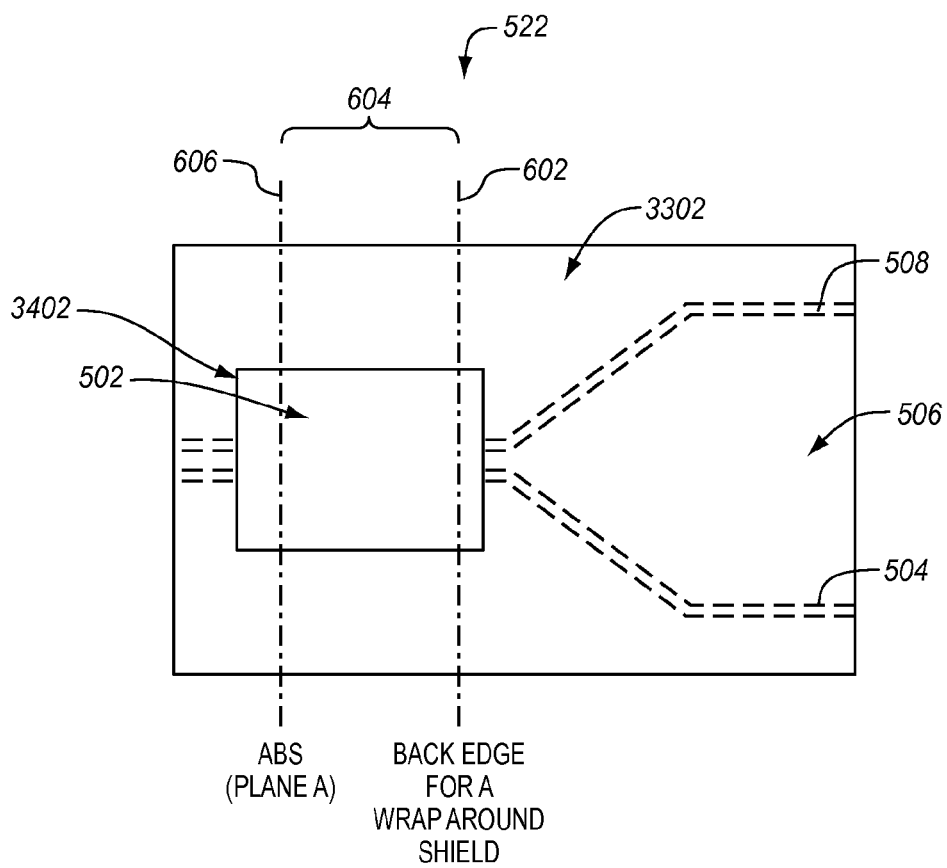

Step 3006 of FIG. 30 comprises performing a removal process which removes a portion of insulating material 3102 exposed by first mask structure 3302. FIGS. 35 and 36 are cross-sectional and top views, respectively, illustrating write head 522 after performing a removal process which removes a portion of insulating material 3102 exposed by first mask structure 3302. Note that FIG. 35 illustrates that non-magnetic layer 502 is exposed along first width 512 proximate to write pole 504.

Figure 37:
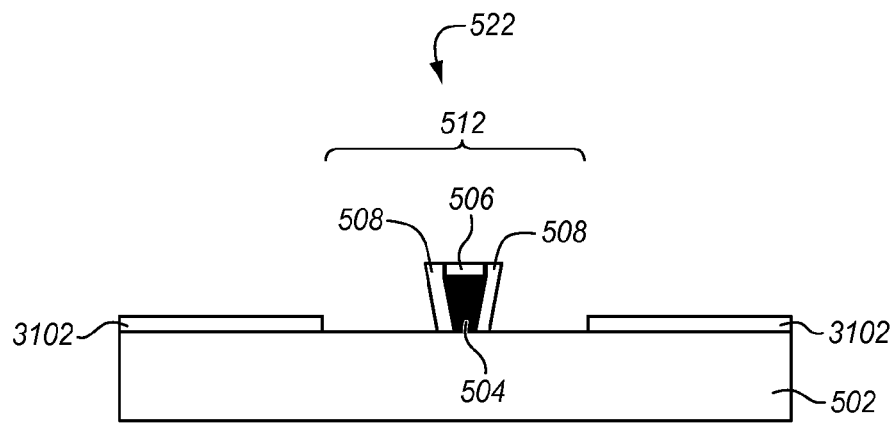
FIGS. 37 and 38 are cross-sectional and top views, respectively, illustrating the write head after removing the first mask structure according to a step of the method of FIG. 30.
Figure 38:
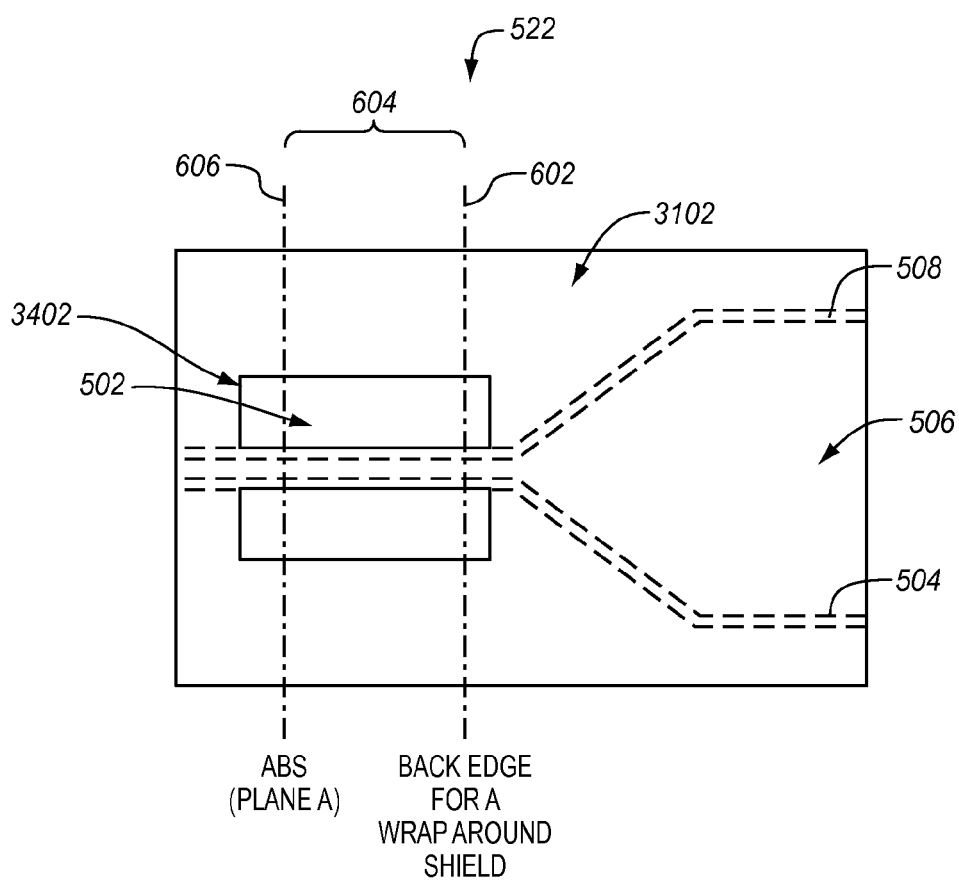

Step 3008 of FIG. 30 comprises removing first mask structure 3302. FIGS. 37 and 38 are cross-sectional and top views, respectively, illustrating write head 522 after removing first mask structure 3302.

Figure 39:
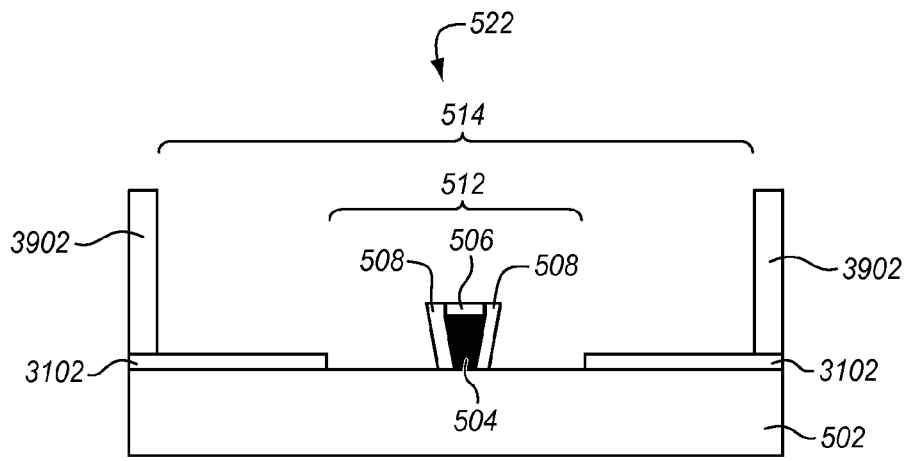
FIGS. 39 and 40 are cross-sectional and top views, respectively, illustrating the write head after forming a second mask structure that defines the back edges of the first and the second magnetic layers and includes an opening for a wrap around shield according to a step of the method of FIG. 30.
Figure 40:
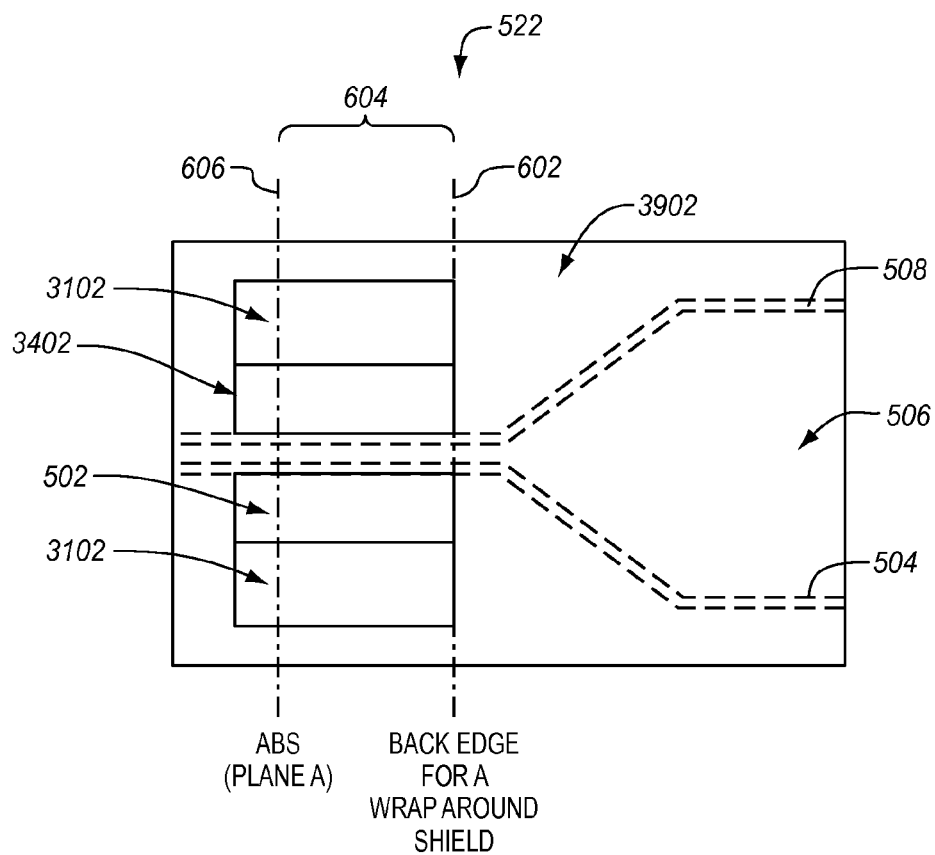

Step 3010 of FIG. 30 comprises forming a second mask structure that defines back edge 602 of first and second layers 510-511 and includes an opening for wrap around shield 520. FIGS. 39 and 40 are cross-sectional and top views, respectively, illustrating write head 522 after forming second mask structure 3902 that defines back edge 602 of first and second magnetic layers 510-511 and includes an opening 3402 for wrap around shield 520 according. Second mask structure 3902 may include a hard mask (not shown), an image transfer mask (not shown), and a resist layer (not shown). In FIGS. 39 and 40, second mask structure 3902 has already been photo patterned to define opening 3402. Opening 3402 exposes a portion of insulating material 3102 and non-magnetic layer 502 along second width 514. Opening 3402 is also disposed along back edge 602 to allow for first and second layers 510-511 to be deposited in place as coplanar.

Figure 41:
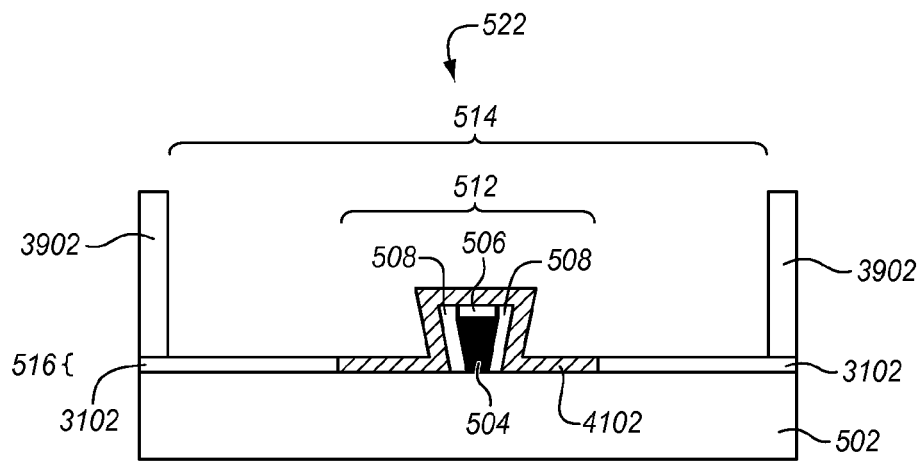
FIGS. 41 and 42 are cross-sectional and top views, respectively, illustrating the write head after depositing a first magnetic material for the wrap around shield according to a step of the method of FIG. 30.
Figure 42:
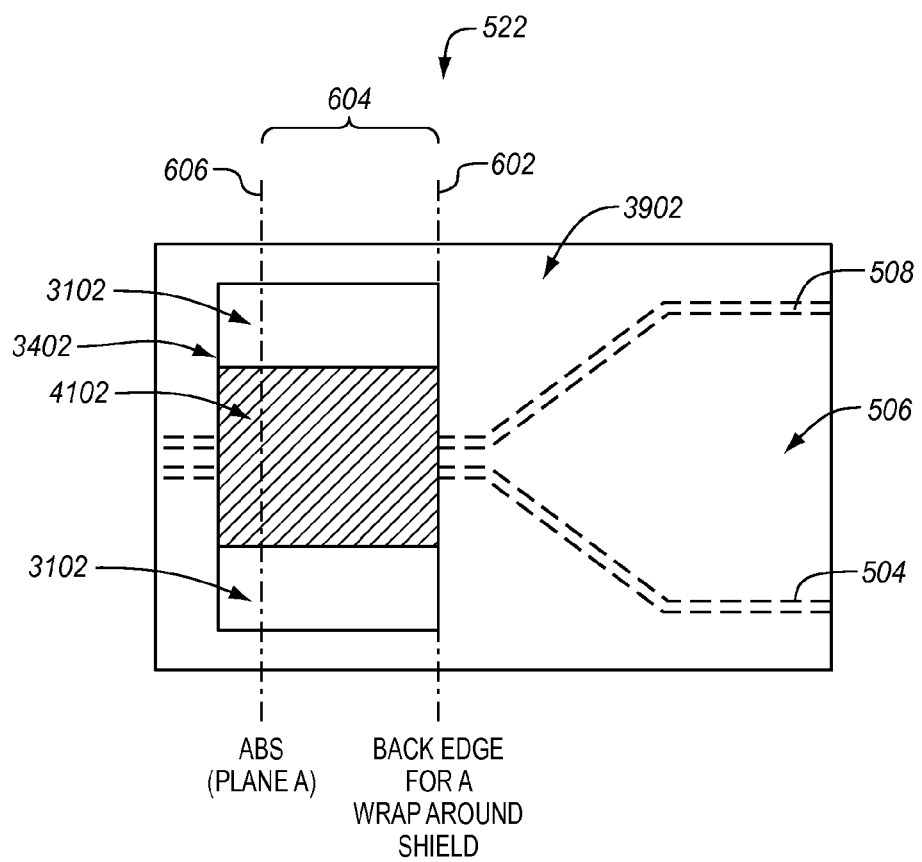

Step 3012 of FIG. 30 comprises depositing a first magnetic material for wrap around shield 520. FIGS. 41 and 42 are cross-sectional and top views, respectively, illustrating write head 522 after depositing first magnetic material 4102 for wrap around shield 520. First magnetic material 4102 is deposited (e.g., by electroplating first magnetic material 4102 on portions of write head 522 not covered by second mask structure 3902 and insulating layer 3102) on gap structure 506 and 508 of main write pole 504 and non-magnetic layer 502 exposed by insulating material 3102. Further, because second mask structure 3902 aligns with back edge 602, a back edge of first magnetic material 4102 also aligns with back edge 602. First magnetic material 4102 may be deposited to a thickness 516 of between about fifty and two hundred nanometers.

Figure 43:
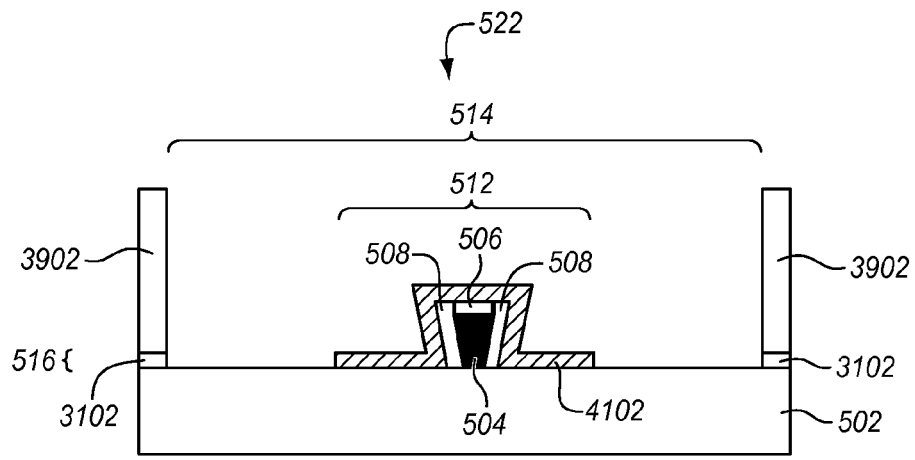
FIGS. 43 and 44 are cross-sectional and top views, respectively, illustrating the write head after performing a removal process which removes portions of the insulating material exposed by the second mask structure according to a step of the method of FIG. 30.
Figure 44:
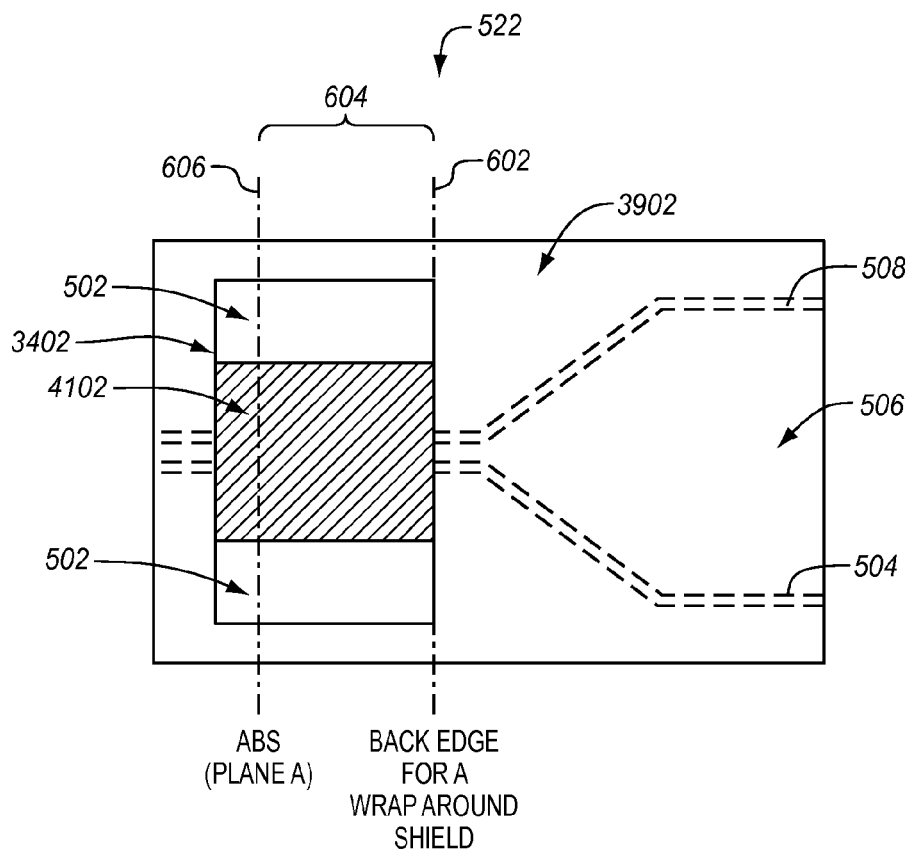

Step 3014 of FIG. 30 comprises performing a removal process which removes a portion of insulating material 3102 exposed by second mask structure 3902. FIGS. 43 and 44 are cross-sectional and top views, respectively, illustrating write head 522 after performing a removal process which removes a portion of insulating material 3102 exposed by second mask structure 3902. Referring to the top view illustrated in FIG. 44, opening 3402 of second mask structure 3902 illustrates how non-magnetic layer 502 is exposed by removing portions of insulating material 3102. In some embodiments, a photo-developer (e.g., Tetramethylammonium Hydroxide or TMAH) is used to remove insulating material 3102 exposed by second mask structure 3902. A photo-developer may be used when more aggressive thin film etchants might damage second mask structure 3902 when attempting to remove portions of insulating material 3102. In some cases, the photo-developer used to remove insulating material 3102 may be the same developer used to pattern second mask structure 3902.

Figure 45:
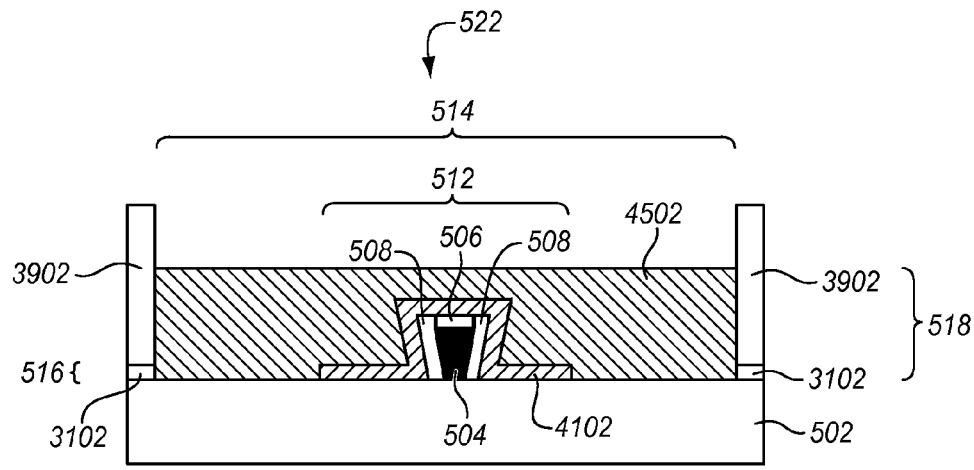
FIGS. 45 and 46 are cross-sectional and top views, respectively, illustrating the write head after depositing a second magnetic material for the wrap around shield according to a step of the method of FIG. 30.
Figure 46:
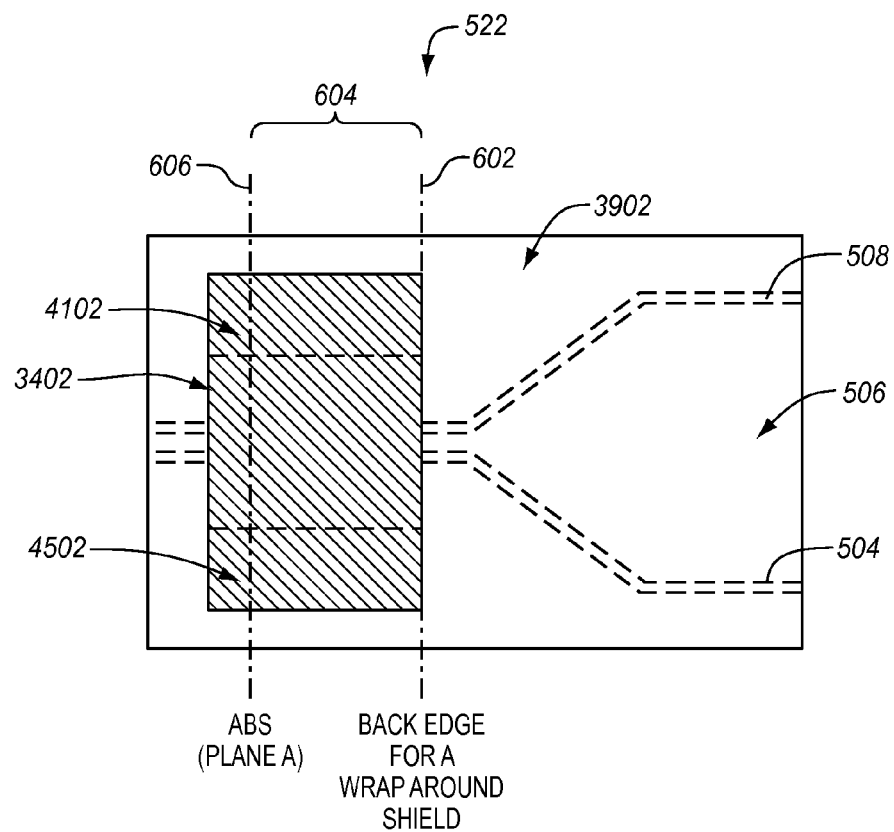

Step 3016 of FIG. 30 comprises depositing a second magnetic material for wrap around shield 520. FIGS. 45 and 46 are cross-sectional and top views, respectively, illustrating write head 522 after depositing a second magnetic material 4502. Second magnetic material 4502 may be deposited to thickness 518 of between about two and three microns. Referring to the top view illustrated in FIG. 46, opening 3402 exposes non-magnetic layer 502 and first magnetic layer 4102 to the deposition process. Material is deposited within opening 3402 such that second magnetic material 4502 along back edge 602 is coplanar with first magnetic material 4102. Second mask structure 3902 may then be removed. Insulation material 3102 exposed by removing second mask structure 3902 may also be removed. The resulting write head 522 is illustrated in FIGS. 5 and 6, where first magnetic material 4102 and second magnetic material 4502 correspond with first layer 510 and second layer 511, respectively.

Although specific embodiments were described herein, the scope of the invention is not limited to those specific embodiments. The scope of the invention is defined by the following claims and any equivalents thereof.

We claim:
1. A magnetic write head, comprising:
 a main write pole including a gap structure for the main write pole; and
 a wrap around shield for the main write pole, wherein the wrap around shield includes:
  a first magnetic layer on a non-magnetic layer and proximate to the main write pole, wherein the first magnetic layer has a first width disposed substantially parallel to the non-magnetic layer along an Air Bearing Surface (ABS); and
  a second magnetic layer on the first magnetic layer and the non-magnetic layer, wherein the second magnetic layer has a second width disposed substantially parallel to the non-magnetic layer along the ABS, wherein the first width of the first magnetic layer is less than the second width of the second magnetic layer, and wherein back edges of the first and the second magnetic layers are coplanar.

2. The magnetic write head of claim 1 wherein the back edges of the first and the second magnetic layers define a throat height for the wrap around shield.

3. The magnetic write head of claim 1 wherein the first magnetic layer has a first thickness, wherein the second magnetic layer has a second thickness, and wherein the first thickness of the first magnetic layer is less than the second thickness of the second magnetic layer.

4. The magnetic write head of claim 1 wherein a thickness of the first magnetic layer is between about 30 nanometers and 100 nanometers.

5. The magnetic write head of claim 1 wherein a thickness of the second magnetic layer is between about 2 and 3 microns.

6. The magnetic write head of claim 1 wherein the first width of the first magnetic layer is between about 2 and 4 microns.

7. The magnetic write head of claim 1 wherein the second width of the second magnetic layer is about 50 microns.

8. The magnetic write head of claim 1 wherein a magnetic moment of the first layer is higher than a magnetic moment of the second layer.

\* \* \* \* \*